(12) United States Patent
Bazaz

(10) Patent No.: US 12,129,772 B1
(45) Date of Patent: Oct. 29, 2024

(54) INDUCED FLOW GENERATOR APPARATUS FOR POWER GENERATION

(71) Applicant: Spar Systems Inc., Montvale, NJ (US)

(72) Inventor: Gaurav Bazaz, Montvale, NJ (US)

(73) Assignee: SPAR SYSTEMS INC., Montvale, NJ (US)

( * ) Notice: Subject to any disclaimer, the term of this patent is extended or adjusted under 35 U.S.C. 154(b) by 60 days.

(21) Appl. No.: 18/095,811

(22) Filed: Jan. 11, 2023

Related U.S. Application Data

(63) Continuation-in-part of application No. 17/390,471, filed on Jul. 30, 2021, now abandoned.

(60) Provisional application No. 63/058,488, filed on Jul. 30, 2020.

(51) Int. Cl.
| | |
|---|---|
| *F01K 13/00* | (2006.01) |
| *F03B 17/00* | (2006.01) |
| *F03G 7/10* | (2006.01) |
| *F01D 15/10* | (2006.01) |

(52) U.S. Cl.
CPC ............ *F01K 13/00* (2013.01); *F03B 17/005* (2013.01); *F03G 7/122* (2021.08); *F01D 15/10* (2013.01)

(58) Field of Classification Search
CPC .. F03B 17/005; F03G 7/122; F05B 2260/601; F01K 13/00
See application file for complete search history.

(56) References Cited

U.S. PATENT DOCUMENTS

| | | | |
|---|---|---|---|
| 8,850,816 B2 * | 10/2014 | North | G06F 1/20 60/671 |
| 2022/0034232 A1 * | 2/2022 | Bazaz | F01D 9/02 |

\* cited by examiner

*Primary Examiner* — Christopher R Legendre
(74) *Attorney, Agent, or Firm* — Hard IP LLC

(57) ABSTRACT

An apparatus for generating power includes a heated fluid reservoir including a heated fluid, a back-pressure control channel, an energy extractor coupled to the heated fluid reservoir and the back-pressure control channel, and a pressure ejector coupled to the back-pressure control channel. The back-pressure control channel includes a fluid mobilization device configured to circulate an internal fluid and to form a low-pressure region within the back-pressure control channel. The energy extractor includes an energy extraction rotor. The low-pressure region in the back-pressure control channel causes the heated fluid from the heated fluid reservoir to be entrained through the energy extractor forming an entrained fluid. The energy extraction rotor is configured to extract power from the entrained fluid. The pressure ejector is configured to transmit the entrained fluid to an exhaust reservoir.

20 Claims, 13 Drawing Sheets

INDUCED FLOW GENERATOR APPARATUS FOR POWER GENERATION

CROSS REFERENCE TO RELATED APPLICATIONS

This application is a continuation-in-part of U.S. patent application Ser. No. 17/390,471, filed on Jul. 30, 2021, which claims priority to U.S. provisional patent application No. 63/058,488 filed Jul. 30, 2020, the contents of both of which are hereby incorporated by reference in their entirety.

TECHNICAL FIELD

The present disclosure generally relates to an Induced Flow Generator ("IFG") apparatus for generating power, and more particularly relates to an induced flow generator apparatus for generating power from a heated fluid.

BACKGROUND

Renewable energy production is largely driven by wind and solar technologies. While these technologies enable clean energy production, they suffer from various shortcomings. One of the more important limitations is intermittency, which means they cannot be turned on or off as needed and depend on environmental factors such as availability of sunlight or wind flow in ideal speed range. Additionally, they cannot be easily sited at any location and are dependent on local climate. They also have a large area footprint, especially solar, for a given amount of power output. Additionally, thermal machines emit large amounts of waste heat, as described by the second law of thermodynamics. Energy may be measured in quad units where one quad unit of energy is equal to $10^{15}$ (a quadrillion) British thermal unit (BTU). In the United States, out of the approximately 100 quads of energy produced annually, over 60 quads is eventually emitted as waste heat. Waste heat is unused heat deposited in a surrounding environment (in the form of thermal energy) by a mechanism such as a heat engine in a thermodynamic process in which it converts heat to useful work. This waste heat can be emitted in the form of heated air, hot flue gases, molten materials, steam, and other media. However, eventually almost all of the waste heat ends up in the atmosphere as heated air. While current solutions exist to recover and re-use waste heat, they are expensive, complex and often uneconomical. Additionally, existing methods for generating power from thermal energy, such as the Traditional Steam Cycle, Organic Rankine Cycle and Kalina Cycle are uneconomical for many conditions, especially when the temperature of the available heat is below 450° F. What is needed is a way to deliver renewable electric power economically from heat, especially from heat with temperatures below 450° F., while overcoming the various limitations of conventional technologies. Specifically, what is needed is a solution that is dispatchable (turned on at any time as needed), non-intermittent (can run as baseload power), highly scalable, with a small footprint, and locatable to any geography.

SUMMARY

The following presents a simplified summary of various aspects of this disclosure in order to provide a basic understanding of such aspects. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the present disclosure, an apparatus for generating power is described. The apparatus includes a heated fluid reservoir including a heated fluid, a back-pressure control channel, an energy extractor coupled to the heated fluid reservoir and the back-pressure control channel, and a pressure ejector coupled to the back-pressure control channel. The back-pressure control channel includes a fluid mobilization device configured to circulate an internal fluid and to form a low-pressure region within the back-pressure control channel. The energy extractor includes an energy extraction rotor. The low-pressure region in the back-pressure control channel causes the heated fluid from the heated fluid reservoir to be entrained through the energy extractor forming an entrained fluid. The energy extraction rotor is configured to extract power from the entrained fluid. The pressure ejector is configured to transmit the entrained fluid to an exhaust reservoir.

In another aspect of the present disclosure, an apparatus for generating power is described. The apparatus includes a heated fluid reservoir including a heated fluid, a back-pressure control channel, a settlement chamber, an energy extractor coupled to the heated fluid reservoir and the settlement chamber, and a pressure ejector coupled to the back-pressure control channel. The back-pressure control channel includes a fluid mobilization device configured to circulate an internal fluid and to form a low-pressure region within the back-pressure control channel. The energy extractor includes an energy extraction rotor. The low-pressure region in the back-pressure control channel causes the heated fluid from the heated fluid reservoir to be entrained through the energy extractor forming an entrained fluid. The energy extraction rotor is configured to extract power from the entrained fluid. The pressure ejector is configured to transmit the entrained fluid to an exhaust reservoir.

In another aspect of the present disclosure, a method of generating power in an induced flow generator apparatus is described. An internal fluid is driven in a closed-loop process, wherein the internal fluid passes through a constriction resulting in a formation of low static pressure region. A heated fluid is received from a source and the heated fluid is sucked into the low-pressure region via an energy extractor in an entrainment process to form an entrained fluid. The entrained fluid is transmitted through a nozzle, wherein thermal energy of the entrained fluid is converted to kinetic energy. The entrained fluid is transmitted to a turbine and causing the turbine to generate mechanical power, which is converted to electric power. The entrained fluid is transmitted to a pressure ejector coupled to a back-pressure control channel, wherein the pressure ejector is configured to expel the entrained fluid to an exhaust reservoir.

BRIEF DESCRIPTION OF THE DRAWINGS

The present disclosure is illustrated by way of example, and not by way of limitation, in the figures of the accompanying drawings, in which.

DETAILED DESCRIPTION

Figure 1:
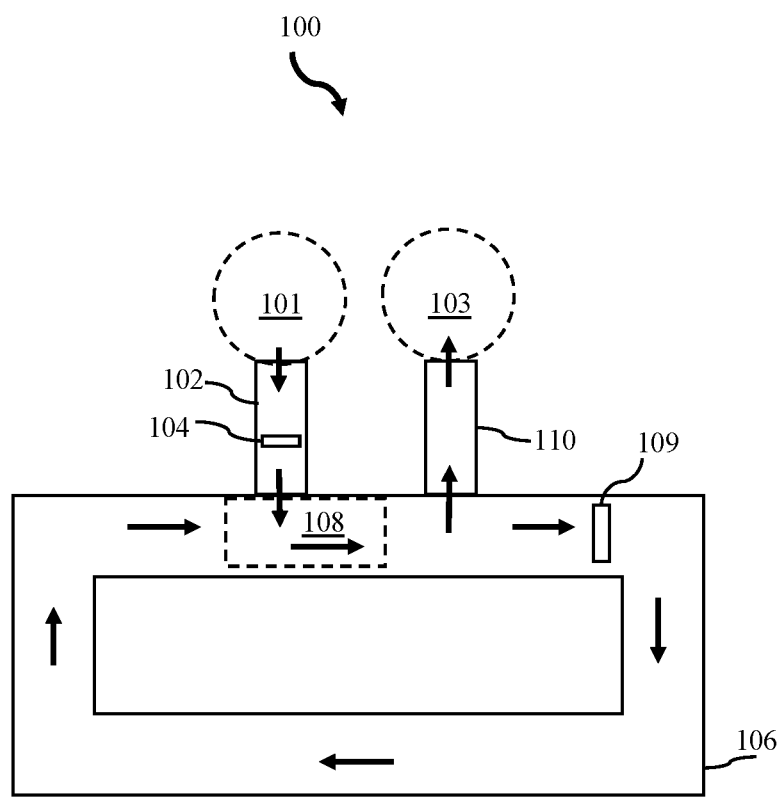
FIG. 1 illustratively depicts an induced flow generator apparatus for generating power, in accordance with an implementation of the disclosure.

Before the present subject matter is described in detail, it is to be understood that this disclosure is not limited to the particular implementations described, as such may vary. It should also be understood that the terminology used herein is for describing particular implementations only, and is not intended to be limiting, since the scope of the present disclosure will be limited only by the appended claims. While this disclosure is susceptible to different implementations in different forms, there is shown in the drawings and will here be described in detail a preferred implementation of the disclosure with the understanding that the present disclosure is to be considered as an exemplification of the principles of the disclosure and is not intended to limit the broad aspect of the disclosure to the implementation illustrated. All features, elements, components, functions, and steps described with respect to any implementation provided herein are intended to be freely combinable and substitutable with those from any other implementation unless otherwise stated. Therefore, it should be understood that what is illustrated is set forth only for the purposes of example and should not be taken as a limitation on the scope of the present disclosure.

In the following description and in the figures, like elements are identified with like reference numerals. The use of "e.g.," "etc.,", "or" and "the like" indicates non-exclusive alternatives without limitation, unless otherwise noted. The use of "having", "comprising", "including" or "includes" means "including, but not limited to," or "includes, but not limited to," unless otherwise noted.

Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" can refer, in one implementation, to A only (optionally including entities other than B); in another implementation, to B only (optionally including entities other than A); in yet another implementation, to both A and B (optionally including other entities). These entities may refer to elements, actions, structures, steps, operations, values, and the like.

The Glossary below provides definitions for terms used in this application:

Total Pressure: This is the sum of the static pressure and dynamic pressure of a fluid.

Static pressure: The pressure applied by a fluid on its container walls, that is not the consequence of the translational motion of the fluid.

Dynamic pressure: The pressure applied by a fluid due to its translational motion.

Total energy (of a fluid): The total energy of a fluid is the sum of the pressure energy, the kinetic energy, and the potential energy.

Conversion of static and dynamic pressure: Static pressure can be converted to dynamic pressure and vice-versa, such that total energy of the fluid is conserved.

Terrestrial atmosphere: Terrestrial atmosphere refers to the atmosphere of Earth, composed mainly of air.

Subsonic and Supersonic: When a fluid is moving slower than the speed (velocity) of sound in the fluid under the given physical conditions (temperature, density, pressure), it is considered subsonic flow. When the fluid is moving faster than the speed (velocity) of sound in the fluid under the given physical conditions (temperature, density, pressure), it is considered supersonic flow.

Compressible flow and laws of compressible flow: When a fluid undergoes changes in density, and the changes in density are sufficiently large that they cannot be ignored in the analysis of the fluid flow, the flow is considered compressible. The physical laws that describe such a flow are the laws of compressible flow. This is distinct from incompressible flow, wherein the density variations are trivial enough that they can be ignored in the analysis of the fluid. Compressible and incompressible flow are well understood terms of art in the field. When a fluid undergoes compressible flow, conversion of thermal energy to kinetic energy can be significant.

Flow channels: This refers to physical structures that constrain the flow of a fluid.

Mass flow rate: The mass of the fluid that travels through a given space or region over a fixed time. It's usually measured in kilogram per second.

An induced flow generator system (also referred to as an apparatus) generates power using pressure differentials and the converts thermal energy to kinetic energy as per the laws of compressible flow. Specifically, the system operates by using phenomena such as entrainment, Venturi acceleration and conversion between dynamic and static pressure. Entrainment is the phenomenon whereby a flowing motive fluid undergoes a static pressure drop relative to the initial static pressure due to a constriction of the flow channels and thereby draws in nearby stationary fluid with higher static pressure and this drawn-in fluid starts flowing with the initial motive fluid. Venturi acceleration is the process whereby a fluid driven through a constricting channel experiences an acceleration and is accompanied by a drop in static pressure and temperature.

Pressure conversion is utilized by the induced flow generator system in order to generate power in an efficient manner. Pressure conversion converts one type of pressure into another type, and vice versa. Static pressure is pressure that is applied within the system when there is no net movement. Dynamic pressure is pressure of a fluid that results from its motion. The interconvertibility of static pressure with dynamic pressure is defined by compressible flow dynamics, and encapsulated in the Navier-Stokes equations. Navier-Stokes equations are partial differential equations which describe the motion of viscous fluid substances. Static pressure of fluids can be converted to dynamic pressure and back to static pressure under variations of flow area (i.e., the area in which the fluids flow), while maintaining a constant total energy, excluding losses. When fluids flow at sufficiently high velocity, usually at more than 0.6 times the speed of the sound in the medium at the given initial temperature, the fluid also shows local variations in density and substantial conversion of thermal energy to kinetic energy as evidenced by change in local temperature of the fluid. Lastly, various methods are available for reducing losses a fluid experiences when flowing through channels. Principles noted above are used in various systems such as eductor pumps, aspirators, and nozzles. Eductor pumps are a jet-type pump that do not need any moving parts to be able to pump out a liquid or gas. The Venturi effect is a constriction within a pipe/tube/channel (e.g., an hourglass shaped pipe) that varies the flow characteristics of a fluid (either liquid or gas) travelling through the tube. As the fluid velocity in a throat of the tube is increased, there is a consequential drop in pressure.

In the induced flow generator, known physical phenomena such as entrainment and Venturi acceleration are used to draw heated stationary fluid from a heat source (e.g., a waste heat source, etc.). Examples of waste heat sources include any source of waste heat such as the air emitted by data centers computers, steam from thermal power plant cooling towers, etc. The heated fluid is entrained through a nozzle to a sufficiently high velocity such that its thermal energy is converted to kinetic energy, as per the laws of compressible flow. This accelerated flow is then passed through a turbine to draw electric power, and the exhaust flow is expelled to an exhaust reservoir. Heated fluid refers to a fluid with temperature higher than the temperature of the exhaust reservoir. In an implementation, the working fluid may be ambient air and the exhaust reservoir is the terrestrial atmosphere.

While the apparatus and method described here apply to most Newtonian fluids, the description mostly uses atmospheric air as the exemplar fluid. Nevertheless, the disclosure here applies to other Newtonian fluids as well, and not just atmospheric air.

Various aspects of the above referenced system are described in detail herein by way of examples, rather than by way of limitation.

FIG. 1 illustratively depicts an Induced Flow Generator ("IFG") apparatus 100 for generating power. The apparatus 100 may include a closed-loop channel (i.e., a complete path is connected in the channel from the input to the output) for generating power. However, other paths or open paths maybe used. The apparatus 100 includes a heated fluid reservoir 101 which provides a heated fluid, an energy extractor 102 ("ET"), a back-pressure control channel ("BPCC") 106, a pressure ejector 110, and an exhaust reservoir 103. In an implementation, the exhaust reservoir 103 is the terrestrial atmosphere. The energy extractor 102 includes an energy extraction rotor 104 which may convert kinetic energy to mechanical energy. The back-pressure control channel 106 includes a low-pressure region 108 (or "LPR") and a fluid mobilization device 109. The low-pressure region 108 is represented by dashed lines but may encompass another larger or smaller region than depicted.

The heated fluid reservoir 101 may be coupled to or otherwise connect with a heat source (e.g., a waste heat source) that provides waste heat. The heated fluid may be stored and transmitted out of the heated fluid reservoir 101. The apparatus 100 is in contact with the heated fluid reservoir 101, from which the heated fluid is drawn in via the energy extractor 102 due to the formation of the low-pressure region 108 inside the back-pressure control channel 106 (details regarding the formation of the low-pressure region 108 are described herein below). The heated fluid, once it enters the energy extractor 102 from the heated fluid reservoir 101, is also referred to herein as entrained fluid since the heated fluid is entrained into the apparatus 100.

In one example, the heated fluid reservoir 101 may be or otherwise contain a constrained quantity of fluid or a heated material exposed to an ambient fluid source, such that low-temperature fluid from an ambient source is heated by the heated (above ambient atmospheric temperature) materials through conduction, convection and/or radiation, and then transmitted or otherwise made available to the energy extractor 102. Examples of heated fluid from a source (such as a waste heat source) may be the heated air expelled from computer servers in data centers, or steam expelled from thermal power plant cooling towers. Examples of heated materials in contact with ambient fluid include molten steel in steel plants in contact with ambient air. The heated fluid may include one or more of air, water, oil, or another Newtonian fluid.

The directional flow of fluid is depicted in the apparatus 100 by using lines with arrows. For example, the directional flow of the heated fluid may begin at the heated fluid reservoir 101 where the fluid is stored, then transmitted and then circulates within the apparatus 100 through the back-pressure control channel 106 and is expelled at the exhaust reservoir 103. However, in other implementations, the flow may traverse in different directions and may originate and/or terminate in different areas than depicted. Furthermore, the entrained fluid may flow and circulate within the back-pressure control channel 106 one or multiple times before exiting at the exhaust reservoir 103. In general, the entrained fluid will exit through the pressure ejector 110 immediately after entering the back-pressure control channel 106.

The back-pressure control channel 106 may be a channel coupled to the energy extractor 102 that runs as a closed-loop in which an internal fluid may circulate (for example, along a path as depicted by the arrows). The internal fluid is a fluid, usually at or near the temperature of the exhaust reservoir 103, which circulates within the back-pressure control channel 106. The internal fluid is placed within the back-pressure control channel either by a user or naturally (ambient air) before the fluid mobilization device 109 is turned on. The internal fluid does not enter or exit the back-pressure control channel during the operation of the induced flow generator apparatus 100, except for minimal losses and variations that are inherent to any real device. The internal fluid is expected to circulate endlessly in the back-pressure control channel, while the fluid mobilization device 109 is kept on.

The back-pressure control channel 106 includes the fluid mobilization device 109. The fluid mobilization device 109 may be an axial fan, a centrifugal fan, a blower, a compressor or a similar turbomachine that puts stationary fluid in motion or enhances the velocity of a flowing fluid in a given direction. The back-pressure control channel 106 includes internal fluid (e.g., ambient air). The fluid mobilization device 109 in the back-pressure control channel 106 may be turned on and turned off. When the fluid mobilization device 109 is turned on, the internal fluid inside the back-pressure control channel 106 would begin to circulate in a closed loop. The internal fluid may flow in an internal layer and the entrainment fluid may flow in an outer layer of the BPCC, as described herein below.

The fluid mobilization device 109 may drive the internal fluid to move within the back-pressure control channel 106, and once in motion, it is expected to provide only the minimum incremental energy to make up for the energy losses the internal fluid experiences in motion. The fluid mobilization device 109 may be a device configured to circulate the internal fluid in response to rotational motion of the device. Specifically, in the back-pressure control channel 106, when internal fluid passes through a constriction (which is a throat of back-pressure control channel 106 (called a BPCC throat), described herein below), the internal fluid undergoes a drop in pressure resulting in formation of the low-pressure region 108. The fluid mobilization device 109 receives on one side the internal fluid and drives out the internal fluid at a higher velocity on the other side. The back-pressure control channel 106 may include a narrow section where the flow of the internal fluid experiences acceleration and undergoes a drop in static pressure, as described by Bernoulli's principle. That is, as the internal fluid moving in the back-pressure control channel 106 enters a constricting channel, the internal fluid speeds up to maintain a fixed mass flow rate. A constricting channel implies a reduction in the cross-sectional area of the channel, so that a control volume of the internal fluid has less space to travel through. The acceleration of the internal fluid is expected to result in a drop in static pressure of the internal fluid through the conversion of a portion of the static pressure to dynamic pressure. This drop in static pressure is expected to form a low-pressure region 108 in the back-pressure control channel 106.

In an implementation, the fluid mobilization device 109 may be driven by an electric motor.

In an implementation, a role of the back-pressure control channel 106 is to form a low-pressure region 108 and maintain it for the duration of operation of the system. At the same time, since the back-pressure control channel 106 may be powered by a fluid mobilization device 109 which draws power, the back-pressure control channel 106 may be configured to minimize the power required by the fluid mobilization device 109 by minimizing the energy losses experienced by the internal fluid travelling in the closed-loop across the back-pressure control channel 106.

Since the power draw of the fluid mobilization device 109 may be influenced by the energy losses experienced by the closed-loop flow of the internal fluid within the back-pressure control channel 106, minimizing these energy losses is expected to result in the minimization of the power draw of the fluid mobilization device 109. Loss minimization steps may include minimizing turbulence at corner bends, selecting the fluid mobilization device 109 based upon its ideal operating point, minimizing surface friction losses, as well as preventing and minimizing flow separation in relevant sections of the back-pressure control channel 106.

In an implementation, once the internal fluid in the back-pressure control channel 106 begins to circulate (for example, the flow follows the direction of the arrows in FIG. 1), the low-pressure region 108 forms near the opening of the energy extractor 102. The low-pressure region 108 represents a pressure differential between the heated fluid in the heated fluid reservoir 101 and the circulating internal fluid in the back-pressure control channel 106. The low-pressure region 108 is located within the back-pressure control channel 106 and may be located as depicted in FIG. 1 or elsewhere within the back-pressure control channel 106. The energy extractor 102 is coupled to the heated fluid reservoir 101 and the back-pressure control channel 106. The energy extractor 102 includes an energy extraction rotor 104. The low-pressure region 108 in the back-pressure control channel 106 causes the heated fluid from the heated fluid reservoir 101 to be entrained through the energy extractor 102 to form the entrained fluid as described below. The energy extraction rotor 104 extracts work from the energy of the heated fluid. The heated fluid becomes the entrained flow once it enters the energy extractor 102 due to the entrainment process noted above.

In an implementation, the energy extractor 102 is connected to (e.g., physically coupled to, through a duct or a collector/hood around the source or not physically coupled to) the heated fluid reservoir 101. The pressure differential between the heated fluid reservoir 101 and low-pressure region 108 is expected to initiate flow of heated fluid transmitted from the heated fluid reservoir 101, through the energy extractor 102 and energy extraction rotor 104, and into the back-pressure control channel 106. With appropriate fluid flow control, the incoming entrained fluid may be redirected to join the internal fluid as an outer layer with minimal turbulence. In other words, the entrained fluid forms an outer layer around the internal fluid.

Referring again to the heated fluid reservoir 101, as the entrained fluid is transmitted by the heated fluid reservoir to the energy extractor 102 and flows through the energy extractor 102, a portion of its thermal energy may be converted to useful work by the energy extraction rotor 104 through the conversion of its pressure energy and thermal energy to kinetic energy in the nozzle shaped part of the energy extractor 102, as per the laws of compressible flow. The nozzle shaped part of the energy extractor 102 may be connected to the heated fluid reservoir 101 on its intake side and to a throat of the back-pressure control channel 106 on the other (output) side. Due to the nozzle shaped part of the energy extractor 102, the energy extractor 102 constricts the flow of the entrained fluid as well and causes the acceleration of the entrained fluid. This process converts the thermal energy to kinetic energy. Within the energy extractor 102, the high-speed flow of the entrained fluid is passed through a turbine to generate mechanical power. Downstream of turbine, the flow is slower and at lower temperature than at the inlet of the energy extractor 102. The entrained flow now enters the back-pressure control channel 106.

In an implementation, the energy extraction rotor 104 is configured for extracting energy from the entrained fluid by rotating in response to fluid flow. As the energy extraction rotor 104 rotates, a dynamo, alternator or similar device for generating electric power may be employed to convert rotational energy to electric energy.

Once the entrained fluid from the energy extractor 102 is stable (i.e., the average of flow characteristics such as velocity, pressure and density as well as their gradients over space are not changing over time) within the back-pressure control channel 106, the entrained fluid may be physically directed to enter the pressure ejector 110 through the use of flow control surfaces (not shown) which direct the flow.

Flow control surfaces are material surfaces that modify the flow of entrained fluid by changing its direction locally.

Since the entrained fluid forms an outer layer around the internal closed-loop flow in the back-pressure control channel 106, it may be cleanly scooped out with appropriate flow control surfaces and redirected into a pressure ejector 110 coupled to the back-pressure control channel 106. At the pressure ejector 110, this entrained fluid is scooped off and expelled to the exhaust reservoir 103.

It is one role of the pressure ejector 110 to expel the entrained fluid to the exhaust reservoir 103. It is expected that under such an ideal operation, the pressure ejector 110 will capture all of the entrained fluid entering via the energy extractor 102 and eject all this entrained fluid to the exhaust reservoir 103.

In an implementation, the pressure ejector 110 effectively raises the total pressure of this entrained fluid with total pressure lower than exhaust reservoir 103 by trapping the internal fluid against a wall momentarily. As waves of entrained flow enter the pressure ejector 110, the additional internal fluid is expected to raise total pressure in a process similar to a pump, thus enabling the ejection of the entrained flow to the exhaust reservoir 103.

An IFG system may use fluids that are lighter in mass such as air and also fluids that are heavier in mass such as water. Lighter fluids refer to fluids for which the gravitational potential energy is trivially small as compared to the pressure, kinetic and thermal energy, and can therefore be ignored in calculating the total fluid energy. In general, if the gravitational potential energy is less than 5%, we can disregard it in the total fluid energy calculation. Heavier fluids refer to fluids for which the gravitational potential energy must be considered in system energy analysis. When the IFG system uses lighter fluids, the system can be rotated in any direction/orientation/plane in space and its operation will be identical. However, when the IFG system uses heavier fluids, the orientation in space matters. In such cases the IFG system should be oriented such that the heated fluid reservoir 101 is at a higher gravitational potential energy and the exhaust reservoir 103 at a lower gravitational potential energy. For lighter fluids, it might be beneficial to orient the induced flow generator apparatus 100 such that the heated fluid reservoir 101 is at a lower height relative to the ground than the height of the exhaust reservoir 103.

The energy efficiency of the IFG system may depend on multiple components. The turbine may be up to 59% efficient, per Betz Law. In one implementation, it is expected to be up to 40% efficient. The fluid mobilization device may be around 90% efficient. The efficiency of the back-pressure control channel can be estimated by referencing the energy efficiency of conventional closed-circuit wind tunnels. Wind tunnels are used for aerodynamic testing in industry, including aerodynamic testing of vehicles, aircrafts and large civil structures. In open circuit wind tunnels, also known as blowdown wind tunnels, the air is generated by a fan, passed over the test article, such as a model airplane, and then expelled into the environment. In comparison, in closed-circuit wind tunnels, the air is recirculated by returning the air back to the fans after it passes over the test article. The efficiency of closed-circuit wind tunnels can be measured as their Energy Ratio. The Energy Ratio is the ratio of flow power in the throat of the wind tunnel compared to fan power. The higher the Energy Ratio, the higher the efficiency of the wind tunnel. In general, wind tunnels regularly achieve Energy Ratios of 5 and often go beyond 10.

Figure 13A:
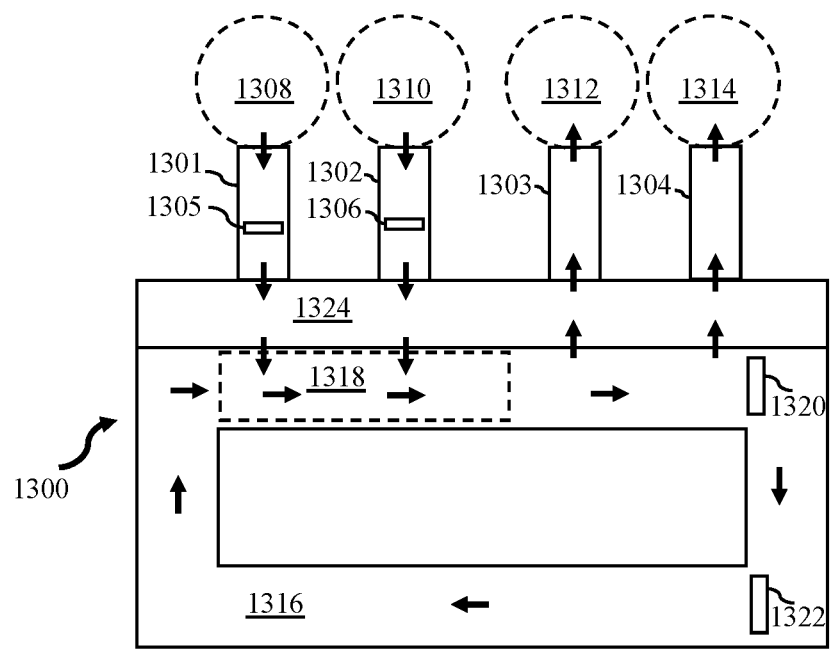
FIG. 13A illustratively depicts an induced flow generator apparatus for generating power, in accordance with another implementation of the disclosure.
Figure 13B:
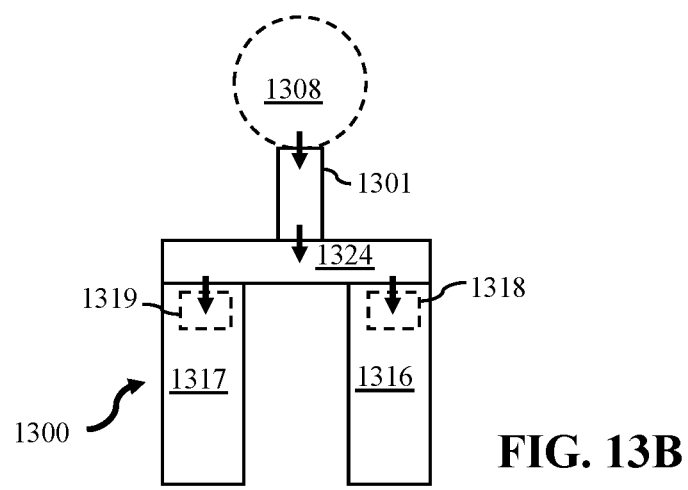
FIG. 13B illustratively depicts an induced flow generator apparatus for generating power portrayed in a different view, in accordance with another implementation of the disclosure.

Although FIG. 1 depicts an apparatus 100 including single elements, in another implementation an apparatus for generating power may include one or more additional back-pressure control channels, energy extractors, fluid mobilization devices, energy extraction rotors, and/or pressure ejectors in any combination thereof, mutually coupled in the same relative arrangement. FIGS. 13A and 13B provide additional information about an apparatus having multiple elements. Although FIGS. 13A and 13B describe exemplary duplicate elements, in other implementations, one, two, or more (or none) of each element may be used.

Figure 2:
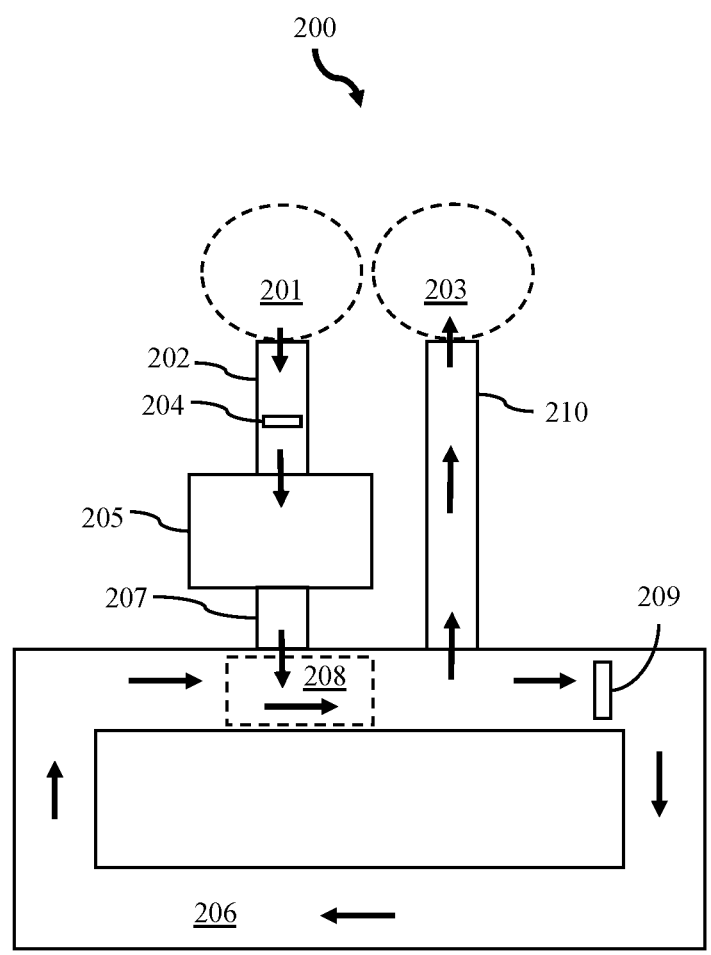
FIG. 2 illustratively depicts an induced flow generator apparatus for generating power that includes a settlement chamber, in accordance with an implementation of the disclosure.

Internal fluid and/or entrained fluid traveling from an energy extractor to a back-pressure control channel may first pass through an energy extractor ("ET") then to the back-pressure control channel ("BPCC") interconnect, hereafter referred to as an "ET-BPCC" interconnect." The ET-BPCC interconnect is designed to ensure a smooth transition of flow from the energy extractor to the back-pressure control channel. As used herein, "ETPE complex" means the region of an apparatus for generating power containing the ET-BPCC interconnect and the connection between the back-pressure control channel and the pressure ejector. As depicted in FIG. 2 and described below, the ET-BPCC interconnect may also be configured to minimize turbulence and flow separation so as to minimize losses.

FIG. 2 illustratively depicts an Induced Flow Generator ("IFG") 200 for generating power and includes a settlement chamber. The apparatus 200 includes a heated fluid reservoir 201 (e.g., a heated fluid reservoir) which provides a heated fluid, an energy extractor 202 ("ET"), a settlement chamber 205, a back-pressure control channel 206, an ET-BPCC interconnect 207, a pressure ejector 210 and an exhaust reservoir 203. The energy extractor 202 includes an energy extraction rotor 204 which may convert energy. The back-pressure control channel 206 includes a low-pressure region 208 (or "LPR") and a fluid mobilization device 209. The apparatus 200 may include a closed-loop channel (i.e., a complete path is connected in the channel from the input to the output) for generating power. However, other paths or open paths maybe used. In an implementation, the exhaust reservoir 203 is the terrestrial atmosphere. The low-pressure region 208 is represented by dashed lines but may encompass another larger or smaller region than depicted. Some of the components of FIG. 1 may be similar to those corresponding components of FIG. 2.

The heated fluid reservoir 201 may be coupled to or otherwise connect with a heat source (e.g., a waste heat source) that provides waste heat. The heated fluid may be stored and transmitted out of the heated fluid reservoir 201. The apparatus 200 is in contact with the heated fluid reservoir 201, from which the heated fluid is drawn in via the energy extractor 202 due to the formation of the low-pressure region 208 inside the back-pressure control channel 206 (details regarding the formation of the low-pressure region 208 are described herein below). The heated fluid, once it enters the energy extractor 202 from the heated fluid reservoir 201, is also referred to herein as entrained fluid since the heated fluid is entrained into the apparatus 200.

In one example, the heated fluid reservoir 201 may be or otherwise contain a constrained quantity of fluid or a heated material exposed to an ambient fluid source, such that a low-temperature fluid from an ambient source is heated by the high-temperature (above ambient atmospheric temperature) materials through conduction, convection and/or radiation, and then transmitted or otherwise made available to the energy extractor 202. Examples of heated fluid from a source (such as a waste heat source) may be the heated air expelled from computer servers in data centers, or steam expelled from thermal power plants cooling towers.

Examples of heated materials in contact with ambient fluid include molten steel in steel plants in contact with ambient air. The heated fluid may include one or more of air, water, oil, or another Newtonian fluid.

The internal fluid may be circulated in the back-pressure control channel 206 in such a way that the flow channel constricts to a smaller cross-sectional area in one region, thereby causing the internal fluid to reduce its static pressure while gaining dynamic pressure as described by the laws of Bernoulli's principle. This is expected to form a low-pressure region 208 at the region where the back-pressure control channel 206 constricts. In an implementation, the low-pressure region 208 is in contact with the ET-BPCC interconnect 207.

The back-pressure control channel 206 may be a channel that runs as a closed-loop wherein the internal fluid may circulate. The fluid mobilization device 209 drives the internal fluid to move within the back-pressure control channel 206, and once in motion it is expected to provide only the minimum incremental energy to make up for the energy losses the internal fluid experiences in motion. The fluid mobilization device 209 may be a device configured to induce flow of a fluid in response to rotation. In an implementation, the fluid mobilization device 209 is driven by an electric motor.

The directional flow of the fluid is depicted in the apparatus 200 by using lines with arrows. For example, the directional flow of the heated fluid may begin at the heated fluid reservoir 201, then transmitted through the energy extractor 202 and then circulates within the apparatus 200 through the back-pressure control channel 206 and is expelled at the exhaust reservoir 203. However, in other implementations, the flow may traverse in different directions and may originate and/or terminate in different areas than depicted. Furthermore, the entrained fluid may flow and circulate within the back-pressure control channel 206 one or multiple times before exiting at the exhaust reservoir 203. In general, the entrained fluid will immediately pass into the pressure ejector 210 after entering the back-pressure control channel 206.

The back-pressure control channel 206 may be a channel coupled to the energy extractor 202 that runs as a closed-loop in which the entrained fluid may circulate (for example, along a path as depicted by the arrows).

The back-pressure control channel 206 includes the fluid mobilization device 209. The fluid mobilization device 209 may be an axial fan, a centrifugal fan, a blower, a compressor or a similar turbomachine that puts stationary fluid in motion or enhances the velocity of a flowing fluid in a given direction. The fluid mobilization device 209 in the back-pressure control channel 206 may be turned on and turned off. When the fluid mobilization device 209 is turned on, the internal fluid inside the back-pressure control channel 206 would begin to circulate in a closed loop. The internal fluid may flow in an internal layer and the entrainment fluid may flow in an outer layer of the BPCC, as described herein below.

The fluid mobilization device 209 receives as an input the fluid and drives out the fluid at a higher velocity as an output. In an implementation, the back-pressure control channel 206 may include a narrow section where the flow of the internal fluid experiences acceleration per Bernoulli's principle. That is, as the internal fluid moving in the back-pressure control channel 206 enters a constricting channel, the internal fluid speeds up to maintain a fixed mass flow rate. A constricting channel implies a reduction in the cross-sectional area of the channel, so that a control volume of the internal fluid has less space to travel through. The acceleration of the internal fluid results in a drop in static pressure of the internal fluid through the conversion of a portion of the static pressure to dynamic pressure. This drop in static pressure results in formation of a low-pressure region 208 in the back-pressure control channel 206.

In an implementation, the fluid mobilization device 209 may be driven by an electric motor.

In an implementation, once the internal fluid in back-pressure control channel 206 begins to circulate, a low-pressure region 208 forms near the opening of the ET-BPCC interconnect 207. The low-pressure region 208 represents a pressure differential between the heated fluid reservoir 201 and the circulating internal fluid in the back-pressure control channel 206. The low-pressure region 208 is located within the back-pressure control channel 206 and may be located as depicted in FIG. 2 or elsewhere within the back-pressure control channel 206. The energy extractor 202 is coupled to the heated fluid reservoir 201 and the settlement chamber 205. The energy extractor 202 includes an energy extraction rotor 204. The low-pressure region 208 in the back-pressure control channel 206 causes the heated fluid from the heated fluid reservoir 201 to be entrained through the energy extractor to form the entrained fluid as described in detail below. The energy extraction rotor 204 extracts power from the entrained fluid.

In an implementation, the energy extractor 202 is connected to (e.g., physically coupled to, through a duct or a collector/hood around the source or not physically coupled to) the heated fluid reservoir 201. This pressure differential between the heated fluid reservoir 201 and the low-pressure region 208 is expected to initiate flow of heated fluid from the heated fluid reservoir 201 forming an entrained fluid which passes through the energy extractor 202 and the energy extraction rotor 204, through the settlement chamber 205 and ET-BPCC interconnect 207, and into the back-pressure control channel 206, due to the low-pressure region 208. With appropriate fluid flow control, the incoming entrained fluid may be redirected to join the internal circulation as an outer layer around the internal fluid circulating within the back-pressure control channel with minimal turbulence.

As the entrained fluid flows through the energy extractor 202, a portion of its thermal energy may be converted kinetic energy by a nozzle structure within the energy extractor 202, and this kinetic energy is extracted as work by the extraction rotor 204. In an implementation, the energy extraction rotor 204 is configured to rotate in response to fluid flow. As the energy extraction rotor 204 rotates, a dynamo, alternator or similar device for generating electric power (not shown) may be employed to convert rotation energy to electric energy.

The settlement chamber 205 is designed to act as a decoupling mechanism between the energy extraction rotor 204 and the low-pressure region 208. As the entrained fluid emerges from the energy extraction rotor 204 inside the energy extractor 202, the entrained fluid is expected to carry various flow instabilities and disturbances such as vortices and turbulence. When these flow instabilities enter the back-pressure control channel 206, they can cause various disruptions and losses.

In an implementation, the settlement chamber 205 allows the flow downstream of the energy extraction rotor 204 to slow down, which is expected to cause most of the instabilities to be attenuated substantially. As a result, the low-pressure region 208 inside the back-pressure control channel 206 may draw the entrained fluid from the settlement chamber 205 through the ET-BPCC interconnect 207 as if it were drawing it from a stable and laminar volume of entrained fluid. This may minimize losses and improve the performance of the apparatus 200. The settlement chamber 205 may also allow various complex flows such as vortices, wakes and local shocks to be dissipated and increase the recovery of static pressure and minimize the impact of energy extraction rotor 204 on flow dynamics into the back-pressure control channel 206.

Once the entrained fluid from the energy extractor 202 is stable (i.e., the average of flow characteristics such as velocity, pressure and density as well as their gradients over space are not changing over time) within the back-pressure control channel 206, the entrained fluid may be physically directed to enter the pressure ejector 210 through the use of flow control surfaces (not shown) which direct the flow. Since the entrained fluid forms an outer layer around the internal closed-loop flow, it may be cleanly scooped out with appropriate flow control surfaces and redirected into the pressure ejector 210.

In an implementation, the pressure ejector 210 effectively raises the total pressure of this entrained fluid with total pressure lower than exhaust reservoir 203, by trapping the entrained fluid against a wall momentarily. As waves of entrained flow enter the pressure ejector 210, the additional entrained fluid is expected to raise total pressure of the trapped entrained fluid, in a process similar to a pump, enabling the ejection of the entrained fluid back to the exhaust reservoir 203.

Additional details regarding individual components of the apparatus 100 and apparatus 200 are described below. These components include an ET-BPCC interconnect, an ET, pressure ejector, back-pressure control channel, ETPE complex and detailed views of other components in apparatus 100 and/or apparatus 200.

Figure 3:
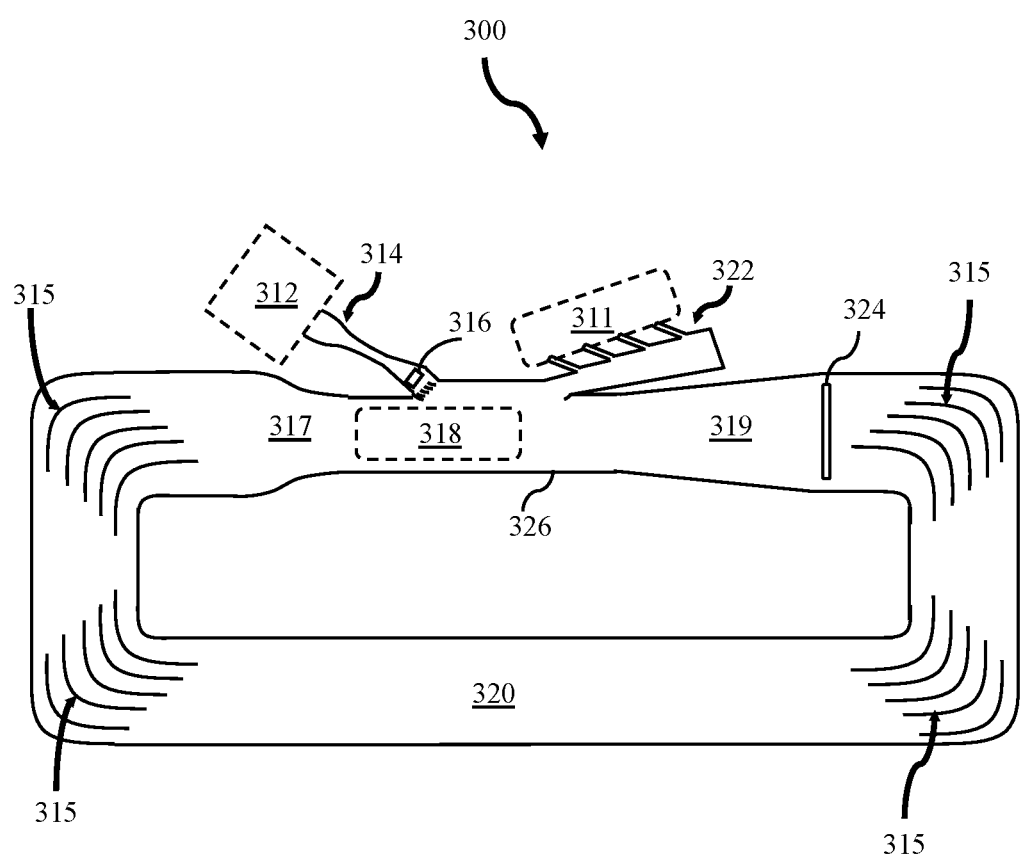
FIG. 3 illustratively depicts a first detailed view of an apparatus for generating power, in accordance with an implementation of the disclosure.

FIG. 3 illustratively depicts a first detailed view of an apparatus 300 for generating power. The apparatus 300 includes a heated fluid reservoir 312 (e.g., a waste heat source), an energy extractor 314, a back-pressure control channel 320, and a pressure ejector 322. Although the depicted implementation shows an open pressure ejector 322, in another embodiment, the pressure ejector 322 could be temporarily closed initially, and opened later and vice versa. The energy extractor 314 includes a turbine 316. The back-pressure control channel 320 includes corner vanes 315, a BPCC contraction 317, a BPCC throat 326, a low-pressure region 318, a BPCC diffuser 319, and a fluid mobilization device 324. The low-pressure region 318 is represented by dashed lines and is a region which may encompass the depicted area or another area.

The apparatus 300 is in contact with a heated fluid reservoir 312, from which heated fluid is entrained through energy extractor 314. The entrained fluid is then expelled via pressure ejector 322 to the exhaust reservoir 311. The entrained fluid may be any of air, water, oil, or another Newtonian fluid.

The back-pressure control channel 320 may be a channel that runs as a closed-loop wherein the internal fluid may circulate. The fluid mobilization device 324 (which may be a fan, for example) drives the internal fluid to move within the back-pressure control channel 320, and once in motion it is expected to provide only the minimum incremental energy to make up for the energy losses the internal fluid experiences in motion. The fluid mobilization device 324 may be a device configured to induce flow of a fluid in response to rotation. In an implementation, the fluid mobilization device 324 is driven by an electric motor and is a conventional axial fan. Other implementations may be used.

In an implementation, the back-pressure control channel 320 also include a back-pressure control channel ("BPCC") contraction 317 wherein the flow experiences acceleration per Bernoulli's principle. That is, as the internal fluid moving in the back-pressure control channel 320 flows into the BPCC contraction 317, it speeds up since the mass flow rate of the internal fluid is fixed. The acceleration of the internal fluid is expected to result in a drop in static pressure of the internal fluid through the conversion of a portion of the static pressure to dynamic pressure. This drop in static pressure is expected to form a low-pressure region 318 in back-pressure control channel 320.

The working mechanism follows the abstract model described in FIG. 1. The internal fluid in the back-pressure control channel 320 and the heated fluid from the heated fluid reservoir 312 are at pressure equilibrium initially, such that both fluid reservoirs are mutually stationary and at same static pressure. Pressure equilibrium is when there is no pressure difference in the fluid between the two regions. In an implementation, the fluid mobilization device 324 causes the internal fluid in the back-pressure control channel 320 to start circulating in a loop, such that the internal fluid passes through the BPCC contraction 317 first, then through the BPCC throat 326 and finally through the BPCC diffuser 319.

As this internal fluid circulates in a closed-loop around the back-pressure control channel 320, it passes through the BPCC contraction 317 whereby the BPCC contraction 317 converts some of its static pressure to dynamic pressure, resulting in an increase in the internal fluid flow velocity and reduction in its static pressure, and resulting in the formation of a low-pressure region 318 (or "LPR") in the BPCC throat 326 of the back-pressure control channel 320. The low-pressure region 318 is expected to cause a pressure difference to form between the back-pressure control channel 320 and the heated fluid from the heated fluid reservoir 312.

The pressure difference at the interface of the low-pressure region 318 in the back-pressure control channel 320 and the heated fluid reservoir 312, experienced at the point where the energy extractor 314 connects with the back-pressure control channel 320, is expected to result in stationary fluid from heated fluid reservoir 312 being entrained and starting to move into the back-pressure control channel 320 through the energy extractor 314. The initiation of this flow from the energy extractor 314 is expected to result in the heated fluid forming an entrained flow which passes through the energy extractor 314 and through the turbine 316. As the entrained fluid passes through the energy extractor 314, it is passed through a nozzle, which causes the conversion of its thermal energy to kinetic energy, and a corresponding drop in temperature. This accelerated entrained fluid is then passed through the turbine 316, causing it to rotate and produce mechanical energy. As a result, the thermal energy of the entrained fluid from the heated fluid reservoir 312 is converted to kinetic energy in the energy extractor 314, this kinetic energy is then converted to mechanical energy by the turbine, this mechanical energy may be converted to electric power by a generator coupled to the turbine.

The entrained fluid passing through the energy extractor ("ET") 314 can be accelerated to high speeds to enhance the performance of the turbine 316 through the use of a nozzle in the energy extractor 314. For purposes of this disclosure, high speeds may be defined as velocities over 15 meters per second, but generally over 150 meters per second. Once the entrained fluid exits from the energy extractor 314 and enters the back-pressure control channel 320, various flow control surfaces and ducts may cause the flow to join smoothly with the closed-loop internal fluid flowing within back-pressure control channel 320. Also, as the entrained fluid flows from the energy extractor 314 and enters the back-pressure control channel 320, it is expected to form an outer layer around the internal fluid in the back-pressure control channel 320. The entrained fluid suffers a drop in temperature through the energy extractor 314, which reflects the energy extracted from it by the turbine-generator.

When this entrained fluid from the energy extractor 314 reaches the pressure ejector ("PE") 322, barriers and control surfaces direct the entrained fluid to enter the pressure ejector 322, while allowing the internal fluid to continue circulating within the back-pressure control channel 320. Through optimization of design and use of actuators to dynamically control the flow control surfaces at the ET-BPCC interface and BPCC-PE interface, one may optimize the flow such that almost all of the entrained fluid from the energy extractor 314 enters the pressure ejector 322, while almost none of the internal fluid in the back-pressure control channel 320 enters the pressure ejector 322. This may be done by physically moving the flow control surfaces and physically modifying the flow direction such that all of the entrained fluid is directed to the pressure ejector 322 while the internal fluid is directed away from the pressure ejector 322. The entrained fluid and internal fluid can be distinguished from each other based on the spatial location within the back-pressure control channel 320 and also based on a difference in flow velocity.

The entrained fluid is expected to pass through the pressure ejector 322 and eventually to reach the end of the pressure ejector 322 where it may be trapped momentarily. As entrained fluid from the energy extractor 314 continuously enters the pressure ejector 322, the entrained fluid is expected to cause the total pressure of the trapped entrained fluid that has already entered the pressure ejector 322 to rise in a pump-like action. The pressure eventually may rise sufficiently to force the entrained fluid out from the outlets at the top of the pressure ejector 322.

In an implementation, the internal fluid of the back-pressure control channel 320 continues to circulate in the back-pressure control channel 320 in an endless loop as long as the fluid mobilization device 324 is kept on. The energy drawn from the turbine 316 is a function of the kinetic energy of the entrained flow when it passes through the turbine 316 and the efficiency of the turbine. Sine the kinetic energy of the entrained fluid in the energy extractor 314 is a function of the conversion of thermal energy of entrained fluid to kinetic energy, the more effectively the thermal energy is converted to kinetic energy in the energy extractor 314, the more power can be generated by the turbine 316.

In an implementation, the power consumed by the apparatus 300 by the fluid mobilization device 324 is a function of the energy losses experienced by the internal fluid in the back-pressure control channel 320. The energy losses may be caused by surface friction, flow separation in certain regions, local turbulence due to various factors such as surface imperfections or sharp corners, as well as the energy losses the flow experiences in bending around corners. In an implementation, the lower the losses, the less power needs to be supplied by the fluid mobilization device 324 to keep the internal fluid circulating at a target speed and pressure. By maximizing the flow rate of the flow through the energy extractor 314, and therefore the turbine 316, and maximizing the conversion of thermal energy to kinetic energy in the energy extractor 314, while minimizing the losses experienced by the circulating internal fluid in back-pressure control channel 320, one may enable a larger power output from turbine 316 than power input to the fluid mobilization device 324.

Within the back-pressure control channel 320, the BPCC diffuser 319 may help return the high-speed, low static pressure flow in the BPCC throat 326 to low-speed, high static pressure flow at the downstream end of the BPCC diffuser 319. In an implementation, the BPCC diffuser 319 can help minimize losses in this dynamic pressure to static pressure conversion. Each corner includes respective corner vanes 315 which are located at every corner of the back-pressure control channel 320, however, more or less corner vanes 315 than depicted may be used. Additionally, the corner vanes 315 help direct the flow around the corners of the back-pressure control channel 320 in an efficient manner so as to minimize the losses around the turns. Finally, to cease operation, the fluid mobilization device 324 may be switched off. In order to restart the operation, the fluid mobilization device 324 may be switched back on.

The order of flow (flow direction) may be important. Specifically, to prevent reverse direction flow from the pressure ejector 322, when the operation is started (or restarted), the pressure ejector 322 may be sealed off from the back-pressure control channel 320 until the entrained fluid from the energy extractor 314 fully develops. The operation of the system is started when the fluid mobilization device 324 is switched on in the back-pressure control channel 320. Flow is considered to be fully developed when the flow is unchanging and local variations in flow are trivially small compared to the overall flow and can be ignored for the purposes of analysis and operation of the device. Once the entrained flow from the energy extractor 314 fully develops, a sealing valve between the pressure ejector 322 and the back-pressure control channel 320 may be opened up and the fully developed entrained flow from the energy extractor 314 is directed into the pressure ejector 322 and it eventually exits to the exhaust reservoir 311.

Additionally, the back-pressure control channel 320 may also include a BPCC diffuser 319 when the cross-section of the back-pressure control channel 320 increases. In an implementation, the BPCC diffuser 319 may decelerate the internal fluid, and consequently raise its static pressure, before the internal fluid flows and reaches the fluid mobilization device 324. The decelerated internal fluid then may be accelerated mechanically by the action of the fluid mobilization device 324 to restore the energy lost by the circulating internal fluid due to energy losses along the back-pressure control channel 320.

In an implementation, the back-pressure control channel 320 includes various flow control surfaces and ducts such as corner vanes 315 to cause the flow to move smoothly with the closed-loop path of the back-pressure control channel 320. Additionally, as the entrained fluid flows from the energy extractor 314 through the turbine 316 and enters into the back-pressure control channel 320, it is expected to form an outer layer around the closed-loop flow of the internal fluid already present in the back-pressure control channel 320. As described above, FIG. 3 may be an implementation of and/or include similar components depicted in FIG. 1. As described herein, FIG. 4 may be an implementation of and/or include similar components depicted in FIG. 2.

In summary, the fluid mobilization device 324 is switched on, causing the internal fluid in back-pressure control channel 320 to start circulating in a closed-loop. As this internal fluid passes through the BPPC contraction 317, it undergoes an acceleration and drop in pressure resulting in the formation of the low-pressure region 318 in the BPCC throat 326. The low-pressure region 318 causes entrainment from the energy extractor 314, which in turn causes entrainment of heated fluid from the heated fluid reservoir 312, forming the entrained fluid. The entrained fluid passes through the energy extractor 314, wherein it passes through a nozzle resulting in the conversion of its thermal energy to kinetic energy, as the entrained fluid accelerates and undergoes a drop in temperature. The entrained fluid then passes through a turbine 316 wherein its kinetic energy is converted to mechanical energy, which may be converted to electric energy by a generator coupled to the turbine 316. Thereafter, the entrained fluid passes into the back-pressure control channel 320 where it forms an outer layer around the internal fluid. Finally, the entrained fluid reaches the inlet of the pressure ejector 322, where it is scooped off and enters the pressure ejector 322 from where it is expelled to the exhaust reservoir 311.

Figure 4:
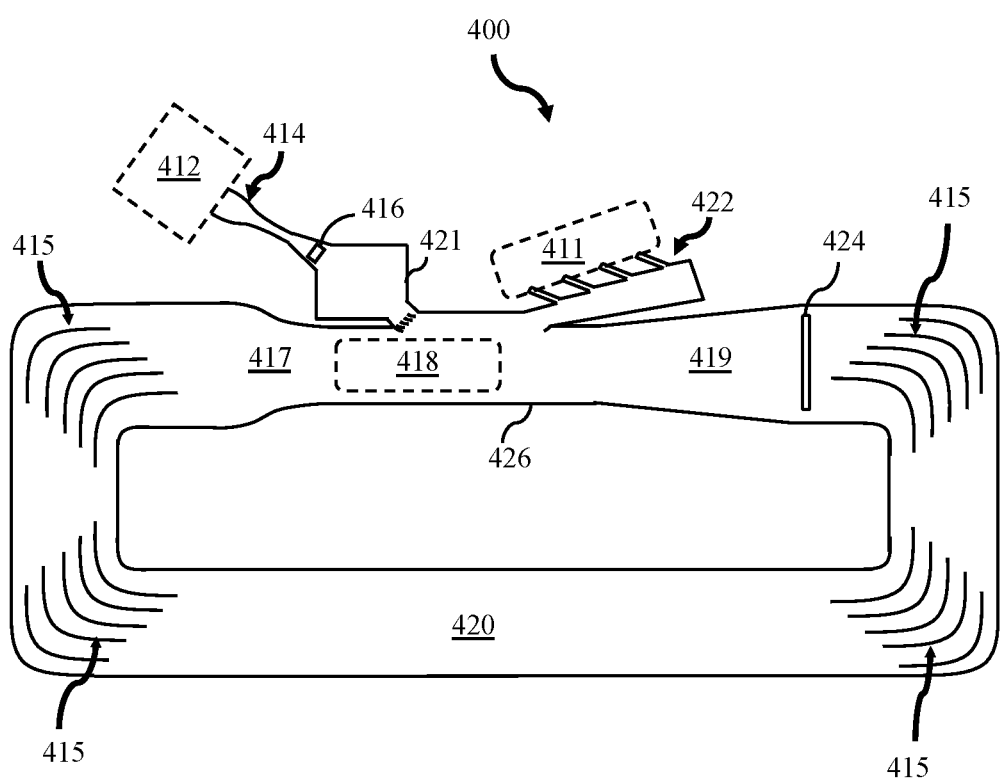
FIG. 4 illustratively depicts a second detailed view detailing an apparatus for generating power that includes a settlement chamber, in accordance with another implementation of the disclosure.

FIG. 4 illustratively depicts a second detailed view detailing an apparatus 400 for generating power that includes a settlement chamber. The apparatus 400 includes a heated fluid reservoir 412 (e.g., waste heat source), an energy extractor 414, a back-pressure control channel 420, a settlement chamber 421, and a pressure ejector 422. The energy extractor 414 includes a turbine 416. The back-pressure control channel 420 includes a BPCC contraction 417, a BPCC throat 426, a low-pressure region 418, a BPCC diffuser 419, and a fluid mobilization device 424, as well as corner vanes 415. Each corner includes respective corner vanes 415 which are located at every corner of the back-pressure control channel 420, however, more or less corner vanes 415 than depicted may be used. The low-pressure region 418 is represented by dashed lines and is a region which may encompass the depicted area or another area.

The apparatus 400 may be an implementation of and/or include similar components as the apparatus 200 depicted in FIG. 2 and described above.

Heated fluid from the heated fluid reservoir 412 is entrained through energy extractor 414 by back-pressure control channel 420 to create entrained fluid. The entrained fluid is expelled via pressure ejector 422 to the exhaust reservoir 411. The entrained fluid may be any of air, water, oil, or another Newtonian fluid.

The back-pressure control channel 420 may be a channel that runs as a closed-loop wherein the internal fluid may circulate. The fluid mobilization device 424 (which may be a fan, for example) drives the internal fluid to move within the back-pressure control channel 420, and once in motion it is expected to provide only the minimum incremental energy to make up for the energy losses the internal fluid experiences in motion. The fluid mobilization device 424 may be a device configured to induce flow of a fluid in response to rotation. In an implementation, the fluid mobilization device 424 is driven by an electric motor and is a conventional axial fan. Other implementations may be used.

In an implementation, the back-pressure control channel 420 also includes a back-pressure control channel ("BPCC") contraction 417 wherein the flow experiences acceleration per Bernoulli's principle. That is, as the internal fluid moving in the back-pressure control channel 420 flows into the BPCC contraction 417, it speeds up to maintain the fixed mass flow rate. The acceleration of the internal fluid is expected to result in a drop in static pressure of the internal fluid through the conversion of a portion of the static pressure to dynamic pressure. This drop in static pressure is expected to form a low-pressure region 418 in back-pressure control channel 420.

Additionally, the back-pressure control channel 420 may also include a BPCC diffuser 419 wherein the cross-section of the back-pressure control channel 420 increases. In an implementation, the BPCC diffuser 419 is configured to decelerate the internal fluid, and consequently raise its static pressure, before the internal fluid reaches the fluid mobilization device 424. The decelerated internal fluid then may be accelerated mechanically by the action of the fluid mobilization device 424.

In an implementation, the back-pressure control channel 420 includes various flow control surfaces and ducts such as corner vanes 415 to cause the flow to move smoothly within the back-pressure control channel 420. Also, the entrained fluid flow from the energy extractor 414 through the turbine 416 is expected to form an outer layer around the closed-loop flow of the internal fluid already present in the back-pressure control channel 420.

The settlement chamber 421 is expected to act as a decoupling mechanism between the turbine 416 and the low-pressure region 418. As the entrained fluid emerges from the turbine 416 inside the energy extractor 414, the entrained fluid is expected to carry various flow instabilities and disturbances such as vortices and turbulence. When these flow instabilities enter the back-pressure control channel 420, they can cause various disruptions and losses.

In an implementation, the settlement chamber 421 allows the flow downstream of the turbine 416 to come to a stable condition, which is expected to cause all the instabilities to be attenuated substantially. As a result, the low-pressure region 418 inside the back-pressure control channel 420 may draw the entrained fluid from the settlement chamber 421 as if it were drawing it from a stable and nearly stationary volume of entrained fluid. This may minimize losses and improve the performance of the apparatus 400. The settlement chamber 421 may also allow various complex flows such as vortices, wakes and local shocks to be dissipated and recovered as static pressure and minimize the impact of turbine 416 on flow dynamics in the back-pressure control channel 420. At the same time, since the low-pressure region 418 may draw entrained fluid from the settlement chamber 421, the low-pressure region 418 may cause the settlement chamber 421 in turn to draw entrained fluid through the turbine 416, via the energy extractor 414 and eventually from the heated fluid reservoir 412.

In summary, the fluid mobilization device 424 is switched on, causing the internal fluid in back-pressure control channel 420 to start circulating in a closed-loop. As this internal fluid passes through the BPPC contraction 417, it undergoes an acceleration and drop in pressure resulting in the formation of the low-pressure region 418 in the BPCC throat 426. The low-pressure region 418 causes entrainment from the settlement chamber, which in turn causes entrainment of heated fluid from the heated fluid reservoir 412, forming the entrained fluid. The entrained fluid passes through the energy extractor 414, wherein it passes through a nozzle resulting in the conversion of its thermal energy to kinetic energy, as the entrained fluid accelerates and undergoes a drop in temperature. The entrained fluid then passes through a turbine 416 wherein its kinetic energy is converted to mechanical energy, which may be converted to electric energy by a generator coupled to the turbine 416. The entrained fluid then passes into the settlement chamber 421, wherein the disturbances to the flow causes by the turbine are attenuated. Thereafter, the entrained fluid passes into the back-pressure control channel 420 where it forms an outer layer around the internal fluid. Finally, the entrained fluid reaches the inlet of the pressure ejector 422, where it is scooped off and enters the pressure ejector 422 from where it is expelled to the exhaust reservoir 411.

Figure 5:
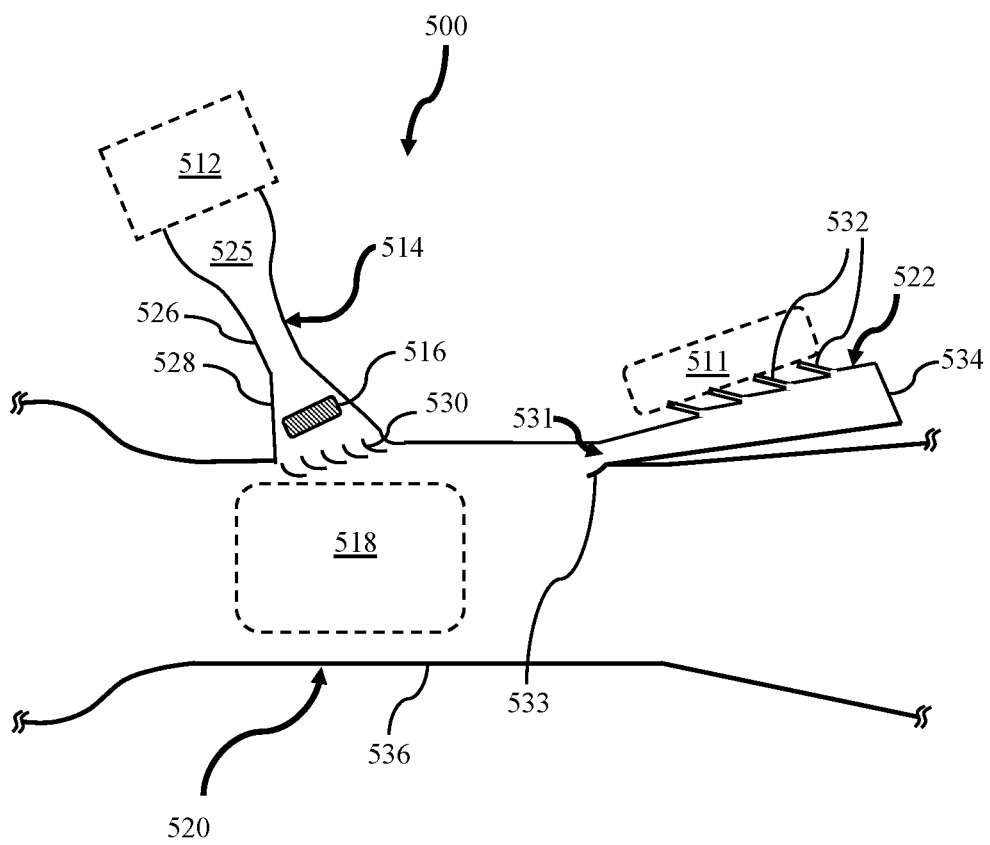
FIG. 5 illustratively depicts detailed view of the ETPE complex, in accordance with an implementation of the disclosure.

FIG. 5 illustratively depicts a detailed view of the ETPE complex 500. FIG. 5 may provide partial details. Specifically, FIG. 5 depicts a close-up view of the ETPE complex (and some adjacent components) of FIG. 1 and/or FIG. 3. FIG. 5 includes a heated fluid reservoir 512, an energy extractor 514, a back-pressure control channel 520, and a pressure ejector 522. The energy extractor 514 includes a turbine 516, an ET nozzle-contraction 525, an ET nozzle-throat 526, an ET-diffuser 528, and flow director vanes 530. The back-pressure control channel 520 includes a BPCC throat 536 and a low-pressure region 518. The pressure ejector 522 includes a PE inlet 531, PE-outlets 532, a PE guide vane 533, and a capping wall 534. Additionally, an exhaust reservoir 511 is depicted. The low-pressure region 518 is represented by dashed lines and is a region which may encompass the depicted area or another area.

The ETPE complex 500 is in contact with a heated fluid reservoir 512 (e.g., a waste heat reservoir), from which heated fluid is drawn in through energy extractor 514. The heated fluid from heated fluid reservoir 512 may be any of air, water, oil, or another Newtonian fluid.

In an implementation, the low-pressure region 518 causes inflow of entrained fluid from reservoir 512 through the energy extractor 514. The initial impetus caused by this inflow is expected to result in some of the static pressure of the entrained fluid converting to dynamic pressure. In an implementation, the energy extractor 514 includes a nozzle with a variable cross-section. In one implementation, the cross-section of the nozzle decreases or contracts along the length of the nozzle and is called "convergent." In an alternative implementation, the cross-section of the nozzle first decreases or contracts and then increases along the length of the nozzle and is called "convergent-divergent."

The heated fluid from the heated fluid reservoir 512 enters through the ET nozzle-contraction 525 as the entrained fluid, where the convergent nozzle is expected to cause the entrained fluid to accelerate substantially. In an implementation, the ET nozzle-contraction 525 is configured to cause the entrained fluid to flow at a velocity that is subsonic. In an implementation, the ET-diffuser 528 (or nozzle divergent section) is configured to cause the entrained fluid to flow at a subsonic velocity. In an alternative implementation, ET nozzle-contraction 525, the ET nozzle-throat 526 and the ET-diffuser 528 (nozzle divergent section) are configured to cause the entrained fluid to flow at a velocity that is a supersonic velocity. Per the laws of compressible fluid flow, when the entrained fluid from the heated fluid reservoir 512 passes through the nozzle and undergoes an acceleration, a part of the thermal energy of this heated fluid is converted to kinetic energy, which expresses as an increase in the flow velocity, with a corresponding decrease in pressure and temperature. The magnitude of increase in velocity is a function of the magnitude of decrease in thermal energy. This entrained fluid passes through the ET nozzle-throat 526 and enters the ET-diffuser 528, then passes into the back-pressure control channel 520 from where it exits through the pressure ejector 522.

In an implementation, the entrained fluid passes through the turbine 516 causing it to rotate. The turbine 516 may be placed in the energy extractor 514 downstream of the ET nozzle-throat 526 or within the ET nozzle-throat 526. When the turbine 516 rotates, it is expected to convert some of the kinetic energy of the entrained flow to mechanical work, which may then be converted to electric power by a coupled generator. As a result of this conversion, the entrained flow loses a part of its kinetic energy.

Once past the turbine 516, the entrained fluid may pass through flow director vanes 530. In an implementation, the flow director vanes 530 redirect the entrained fluid to smoothly join the flow in the back-pressure control channel 520 through the low-pressure region 518. This entrained fluid once inside the back-pressure control channel 520 travels along the path of the closed-loop flow of internal fluid as an outer layer and eventually reaches the PE (pressure ejector) inlet 531. At the PE inlet 531, PE guide vanes 533 may direct the entrained flow into the pressure ejector 522. The PE guide vanes 533 and flow director vanes 530 may be mounted on actuators so they adjust the fluid flows dynamically to optimize flow to required parameters. Primarily, the flow director vanes 530 are expected to optimize for the joining of the entrained fluid from energy extractor 514 into the back-pressure control channel 520, so as to minimize the turbulence. The PE guide vanes 533 may optimize to capture maximum of the entrained fluid coming from energy extractor 514. Further, the PE guide vane 533 may minimize the mass of the internal fluid in closed-loop flow within the back-pressure control channel 520 entering the pressure ejector 522.

In an implementation, the pressure ejector 522 is a channel with a capping wall 534 at the end. The entrained fluid now entering the pressure ejector 522 may crash into the capping wall 534 to be at least momentarily trapped and delayed as it expels out to the exhaust reservoir 511. This trapped entrained fluid in the pressure ejector 522 experiences an elevating total pressure inside the pressure ejector 522 due to the waves of incoming entrained fluid flowing into the capping wall 534, which enables the entrained fluid to be expelled to the exhaust reservoir 511 through the PE-outlets 532. The entrained fluid might be trapped in the pressure ejector for less than a few seconds. The entrained fluid thus completes a full cycle from heated fluid reservoir 512, through the energy extractor 514 and turbine 516, into the back-pressure control channel 520 through its low-pressure region 518, into the pressure ejector 522, and finally expelled out to exhaust reservoir 511.

Figure 6:
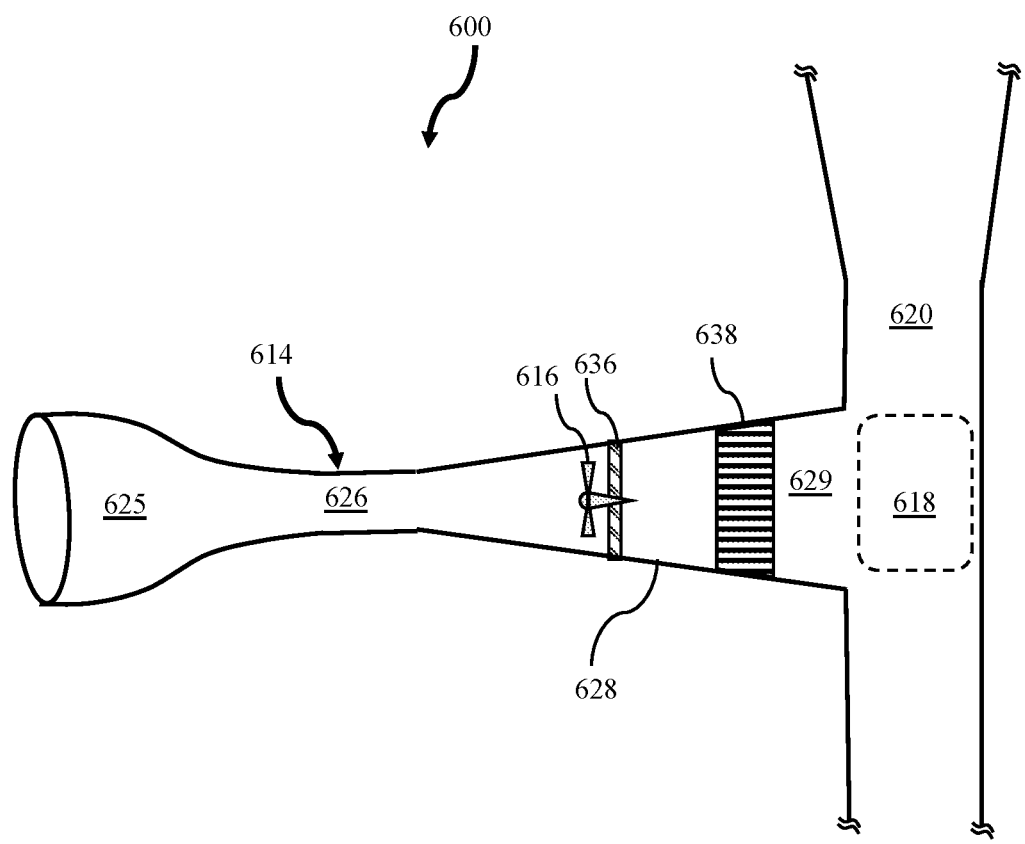
FIG. 6 illustratively depicts an ET-BPCC interconnect, in accordance with an implementation of the disclosure.

FIG. 6 illustratively depicts an ET-BPCC interconnect 600. FIG. 6 may partially depict an ET-BPCC interconnect. Specifically, FIG. 6 depicts a close-up view of ET and some adjacent components of FIG. 1 and/or FIG. 3. The ET-BPCC interconnect 600 includes an energy extractor 614 and a back-pressure control channel 620. The energy extractor 614 includes a turbine 616, an ET nozzle-contraction 625, an ET nozzle-throat 626, an ET-diffuser 628, an ET-outlet 629, a turbine support 636, and flow straighteners 638. The back-pressure control channel 620 includes a low-pressure region 618.

In an implementation, low-pressure held within the low-pressure region 618 is downstream of the ET-outlet 629. The low-pressure of the low-pressure region 618 inside the back-pressure control channel 620 is expected to cause the entrained fluid to move out from the ET-outlet 629 into the back-pressure control channel 620. The movement of this entrained fluid triggers the movement of entrained fluid throughout the energy extractor 614 to move through the energy extractor 614. The entrained fluid is expected to impinge upon the turbine 616, thus causing it to rotate.

The turbine 616 may be mounted on the turbine support 636 which may be attached to the walls of the energy extractor 614. Once the entrained fluid crosses the turbine 616, it is expected to be turbulent due to interaction with the turbine blades. In order to smoothen the flow of the entrained fluid before it enters the back-pressure control channel 620, one or more flow straighteners 638 may be placed in the ET-diffuser 628. In an implementation, the flow straighteners 638 consist of a series of narrow parallel pathways, like a honeycomb, through which the entrained fluid flows, causing the turbulence to reduce and entrained fluid to become relatively laminar.

The first section of the energy extractor 614 may consist of an ET nozzle-contraction 625, which causes the entrained fluid to accelerate due to the reducing channel area.

The entrained fluid is expected to stabilize at high flow velocity in the ET nozzle-throat 626. Once past the ET nozzle-throat 626, the entrained fluid may enter the ET-diffuser 628 where it may expand into a larger area channel and slow down again. This convergent-divergent nozzle model is designed to enable efficient conversion of the thermal energy of the entrained flow into kinetic energy, which may be used by the turbine 616 to produce mechanical rotation which may be converted to electrical power through a coupled electric generator.

In alternative implementations, the energy extractor 614 may consist of a straight channel with equal area at all points. Therefore, the ET nozzle-contraction 625, ET nozzle-throat 626 and ET-diffuser 628 may be omitted. In some implementations, even the flow straighteners 638 may be eliminated. Note also, while FIG. 6 depicts a single turbine 616 in the energy extractor 614, in other implementations multiple turbines may be installed in parallel, series, or both, in the energy extractor 614. Additionally, in some implementations, the ET-diffuser 628 (or nozzle divergent section), ET nozzle-throat 626 and ET nozzle-contraction 625 may be configured such that the entrained fluid accelerates further instead of slowing down in the ET divergent section, enabling supersonic flow. In this case, the turbine 616 may be placed near the downstream end of the ET-diffuser 628. In each case, the thermal energy of the entrained fluid from the source is converted to kinetic energy which drives the turbine to generate mechanical power which is then converted to electrical power.

In an implementation, the energy extractor 614 is connected to a settlement chamber instead of being connected directly to the back-pressure control channel 620. This allows the instabilities introduced by the turbine 616 to be mitigated and energy contained in unstable flows such as vortices to be returned to static pressure in the settlement chamber before being drawn into the back-pressure control channel 620 by the low-pressure region 618.

Figure 7:
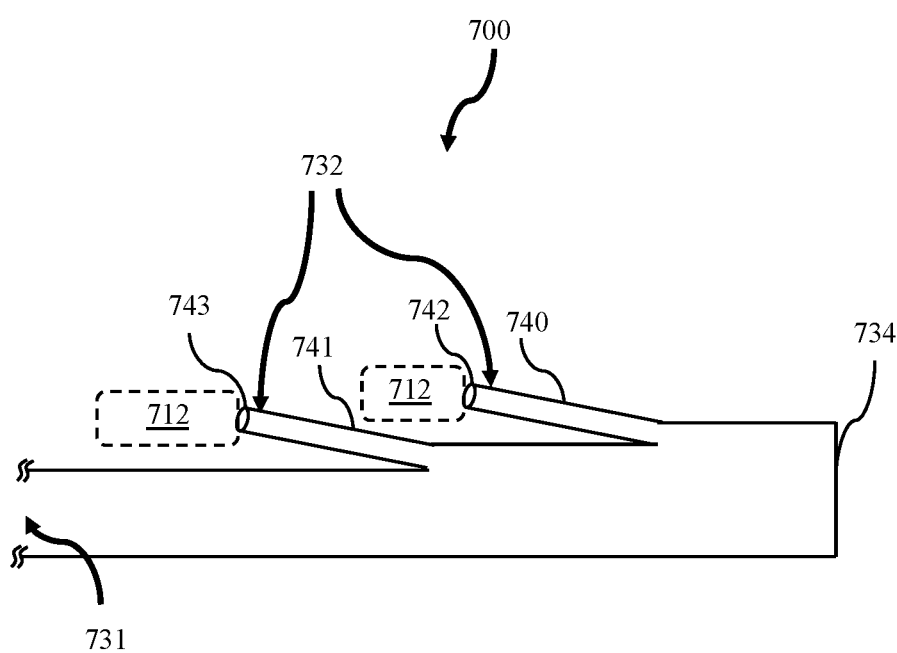
FIG. 7 illustratively depicts a pressure ejector, in accordance with an implementation of the disclosure.

FIG. 7 illustratively depicts a pressure ejector 700. Specifically, FIG. 7 depicts a close-up view of a pressure ejector 700 as well as adjacent components such as depicted in FIG. 1 and/or FIG. 2 as well as FIG. 3 and FIG. 4. FIG. 7 includes an exhaust reservoir 712.

The pressure ejector 700 also includes a PE inlet 731, PE-outlets 732, a capping wall 734, an outlet channel 740, an outlet channel 741, an outlet opening 742, and an outlet opening 743.

The entrained fluid from the energy extractor is expected to flow in from the PE inlet 731. This entrained fluid may be at a lower total pressure than exhaust reservoir 712 since it has lost some energy to the turbine along its path. As depicted in FIG. 7, the entrained fluid is expected to travel from left to right. Since the pressure ejector 700 has a capping wall 734, the entrained fluid entering it will be blocked from exiting along the main channel. As such, a stationary mass of trapped entrained fluid is expected to form inside the pressure ejector 700. As new entrained fluid flows in, it may cause the existing entrained fluid volume to compress which may raise the total pressure of the entrained fluid in the pressure ejector 700 in a pump-like action.

Once the total pressure of the entrained fluid in the pressure ejector 700 rises sufficiently, it is expected to start exiting through the PE-outlets 732 through the outlet openings 742 and/or 743. As such, an equilibrium may form wherein the pressure of the entrained fluid inside the pressure ejector 700 is raised to a higher level than the static pressure of the exhaust reservoir 712, by the pump-like action of the incoming fluid through the PE inlet 731. The rate of fluid entry through the PE inlet 731 and the rate of fluid exit through the PE-outlets 732 are expected to equalize such that there is no further net accumulation of entrained fluid in the pressure ejector 700 after a certain point in time. As a result, in this equilibrium state, fluid may enter the pressure ejector 700 at a fixed rate, leave the pressure ejector 700 at the same rate through the PE-outlets 732, while temporarily residing in a trapped stationary state in the pressure ejector 700.

Figure 8:
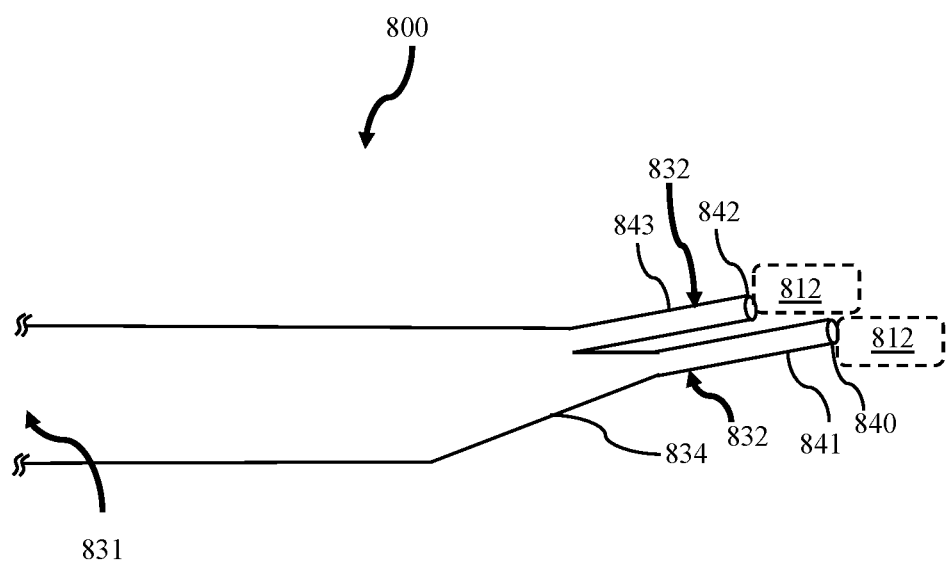
FIG. 8 illustratively depicts a pressure ejector, in accordance with another implementation of the disclosure.

FIG. 8 illustratively depicts a pressure ejector 800. FIG. 8 depicts a close-up view of some aspects of FIG. 1 and/or FIG. 2. Specifically, FIG. 8 depicts a close-up view of a pressure ejector 800 as well as adjacent components of FIG. 1 and/or FIG. 2. FIG. 8 includes exhaust fluid reservoir 812. The pressure ejector 800 also includes a PE inlet 831, PE-outlets 832, an outlet channel 841, an outlet channel 843, an outlet opening 840, an outlet opening 842, and an end wall 834.

The entrained fluid may flow in a direction originating from the PE inlet 831. As depicted in FIG. 8, the entrained fluid is expected to travel from left to right. As the entrained fluid travels left to right in FIG. 8, it may be directed by the end wall 834 towards the PE-outlets 832. The entrained fluid entering the pressure ejector 800 may have a lower static pressure than the exhaust reservoir 812. If the entrained fluid entering the pressure ejector 800 has sufficient dynamic pressure or total pressure, it may overcome the static pressure of the exhaust reservoir 812 and exit from the pressure ejector 800 into the exhaust reservoir 812 through the PE-outlets 832 without requiring a pressure elevation process.

In an implementation, the PE-outlets 832 include at least one of an outlet opening 840 and/or and outlet opening 842 configured to cause the entrained fluid to exit the pressure ejector 800 and expel to the exhaust reservoir 812 without being trapped or delayed. In an alternative implementation, the PE-outlets 832 may include additional outlet openings.

Figure 9:
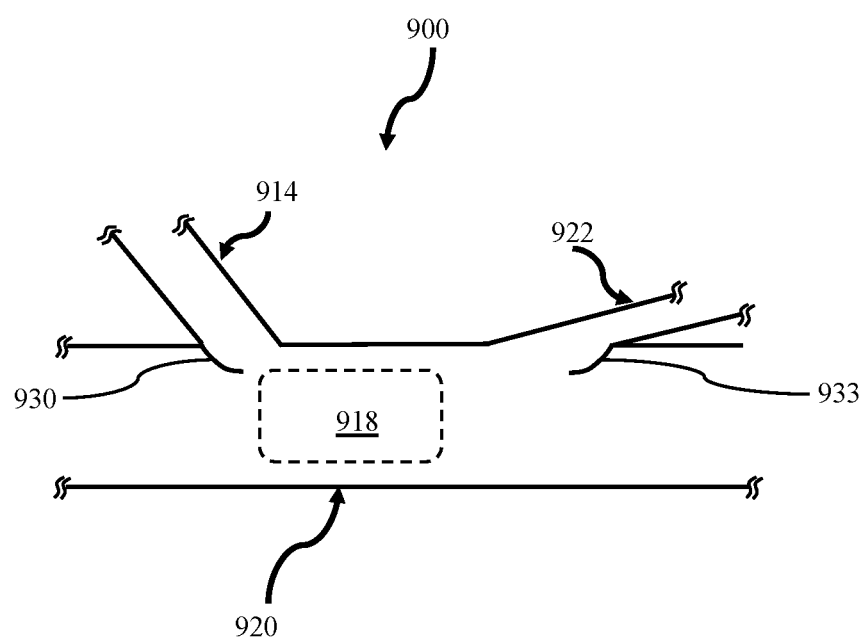
FIG. 9 illustratively depicts an ETPE complex, in accordance with another implementation of the disclosure.

FIG. 9 illustratively depicts an ETPE complex 900. FIG. 9 depicts a close-up view of some aspects of FIG. 1 and/or FIG. 2, as well as FIG. 3 and/or FIG. 4. Specifically, FIG. 9 depicts an ETPE complex 900 as well as adjacent components of FIG. 1 and/or FIG. 2 as well as FIG. 3 and/or FIG. 4. The ETPE complex 900 includes an energy extractor 914, a back-pressure control channel 920, and a pressure ejector 922. The back-pressure control channel 920 includes a low-pressure region 918, a flow director vane 930, and a guide vane 933.

As described above, the ETPE complex 900 may be component of the apparatus 100 or apparatus 200 or apparatus 300 or apparatus 400, depicted in FIG. 1, or FIG. 2, or FIG. 3, or FIG. 4 respectively, and described above.

FIG. 9 depicts a fluid flow area in more detail than depicted in FIG. 1 and FIG. 2. The internal structure of the energy extractor 914 and internal structure of pressure ejector 922 is not depicted for economy of space. Entrained fluid is expected to enter through the energy extractor 914 into the back-pressure control channel 920 in the low-pressure region 918. In an implementation, this entrained fluid is redirected by the flow director vane 930 to become parallel to the internal fluid flow within the back-pressure control channel 920. The redirected entrained fluid inside the back-pressure control channel 920 then may reach the pressure ejector 922 and may be directed into the pressure ejector 922 by the guide vanes 933. At the same time, the upstream closed-loop flow of the internal fluid in the back-pressure control channel 920 is expected to continue along its path within the back-pressure control channel 920 unperturbed.

Figure 10:
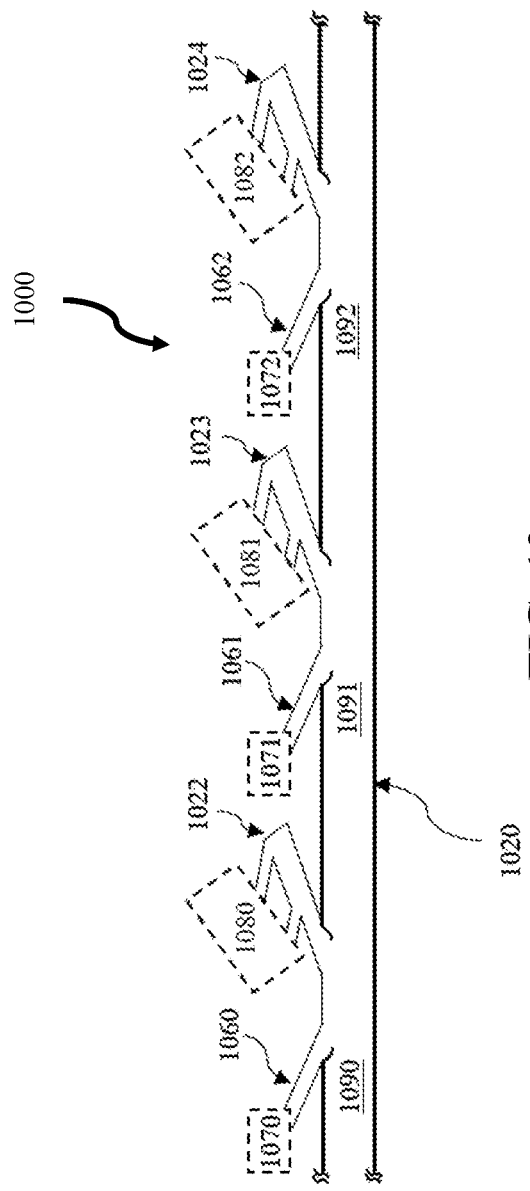
FIG. 10 illustratively depicts an ETPE complex, in accordance with another implementation of the disclosure.

FIG. 10 illustratively depicts an ETPE complex 1000. FIG. 10 depicts a close-up view of some aspects of FIG. 1 and/or FIG. 2. Specifically, FIG. 10 depicts ETPE complex as well as adjacent components of FIG. 1 and/or FIG. 2. FIG. 10 includes heated fluid reservoirs 1070, 1071 and 1072, an entry channel 1060, an entry channel 1061, an entry channel 1062, a back-pressure control channel 1020, a pressure ejector 1022, a pressure ejector 1023, and a pressure ejector 1024, and exhaust reservoirs 1080, 1081 and 1082. The back-pressure control channel includes low-pressure regions 1090, 1091 and 1092.

As described above, the ETPE complex 1000 may be a component of apparatus 100 or apparatus 200, depicted in FIG. 1 or FIG. 2, respectively, and described above.

The ETPE complex 1000 is in contact with heated fluid reservoirs, 1070, 1071 and 1072, from which heated fluid is drawn in through any or all of entry channel 1060, entry channel 1061, and/or entry channel 1062. The entrained fluid is expelled to exhaust reservoirs 1080, 1081 and 1082 through the pressure ejector 1022, pressure ejector 1023, and/or pressure ejector 1024. The heated fluid from the reservoirs 1070, 1071 and 1072 may be any of air, water, oil, or another Newtonian fluid.

Each of entry channel 1060, entry channel 1061, and entry channel 1062 enables entrained fluid to enter from the reservoirs 1070, 1072 and 1072. Each of pressure ejector 1022, pressure ejector 1023, and pressure ejector 1024 allows entrained fluid to flow to the exhaust reservoirs 1080, 1081 and 1082. In an implementation, at least two entry channel—pressure ejector pairs are configured in a series arrangement, which may allow the low-pressure regions 1090, 1091 and 1092 in the back-pressure control channel 1020 to entrain and process substantially more entrained fluid than with just one entry channel and one exit channel. This is expected to enable a larger ratio of entrained fluid mass flow rate to internal fluid mass flow rate in the back-pressure control channel 1020.

Each of entry channel 1060, entry channel 1061, and/or entry channel 1062 may be any of energy extractor 102, energy extractor 202, energy extractor 414, energy extractor 514, energy extractor 614, and/or energy extractor 914, as depicted in FIG. 1, FIG. 2, FIG. 4, FIG. 5, FIG. 6, and FIG. 9, respectively. Alternatively, any or all of entry channel 1060, entry channel 1061, and/or entry channel 1062 may feed into a larger channel which forms an energy extractor by merging multiple entry channels. FIG. 10 depicts three entry channels and three pressure ejectors, but in other implementations any number of such pairs might be used. Exhaust reservoirs 1080, 1081 and/or 1082 maybe the same, separate or connected to each other.

Figure 11:
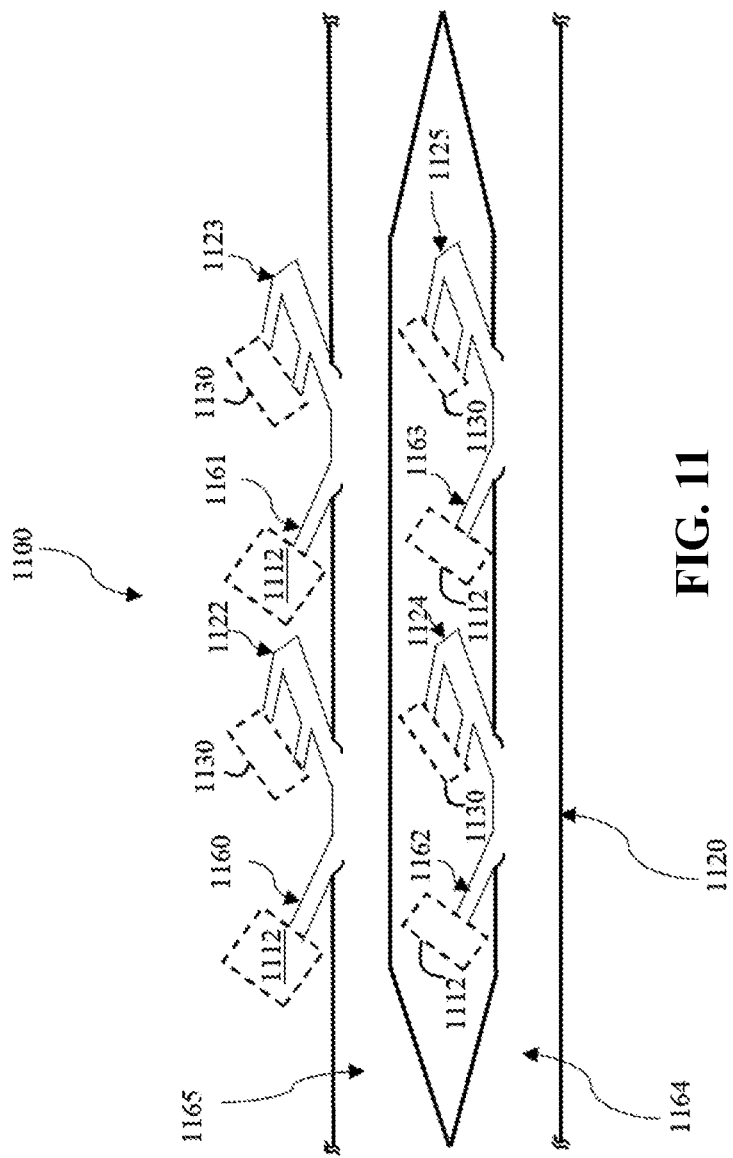
FIG. 11 illustratively depicts an ETPE complex, in accordance with an implementation of the disclosure.

FIG. 11 illustratively depicts an ETPE complex 1100. FIG. 11 depicts a close-up view of some aspects of FIG. 1 and/or FIG. 2. Specifically, FIG. 11 depicts an ETPE complex 1100 and adjacent components. FIG. 11 includes a heated fluid reservoir 1112 and exhaust reservoir 1130. Apparatus 1100 includes an entry channel 1160, an entry channel 1161, an entry channel 1162, an entry channel 1163, a pressure ejector 1122, a pressure ejector 1123, a pressure ejector 1124, and a pressure ejector 1125. The ETPE complex 1100 also includes sub-channels 1164 and 1165 which together form the back-pressure control channel 1120.

As described above, the ETPE complex 1100 may be a component of apparatus 100 or apparatus 200, depicted in FIG. 1 or FIG. 2, respectively, and described above. The ETPE complex 1100 is in contact with a heated fluid reservoir 1112 from where the entrained fluid is drawn in through any or all of entry channel 1160, entry channel 1161, entry channel 1162, and/or entry channel 1163. The entrained fluid is expelled via any or all of pressure ejector 1122, pressure ejector 1123, pressure ejector 1124, and/or pressure ejector 1125 into the exhaust reservoir 1130. The entrained fluid may be any of air, water, oil, or another Newtonian fluid.

In this implementation, the back-pressure control channel 1120 itself splits into two or more sub-channels 1164 and 1165, such that at least two of the pressure ejectors selected from pressure ejector 1122, pressure ejector 1123, pressure ejector 1124, and/or pressure ejector 1125, and at least two of the entry channels 1160, 1161, 1162 and/or 1163 are configured in a parallel arrangement. In this implementation, the low-pressure region of the back-pressure control channel 1120 also splits across these sub-channels 1164 and 1165. In FIG. 11, two such sub-channels 1164 and 1165 are depicted, but in various implementations, the back-pressure control channel 1120 could split into many parallel sub-channels. Each of the subchannels may include entry channels and alternate paths of entry channel-pressure ejectors in pairs. FIG. 11 depicts two such "entry channel-PE" pairs, but in other implementations additional sub-channels and greater or fewer entry channel-PE pairs per each of the subchannels may be utilized as well. In one implementation, the entrained fluid is air, the exhaust reservoir is the terrestrial atmosphere, and the heated fluid reservoir is any of data centers, thermal power plants, industrial machinery, etc.

Figure 12:
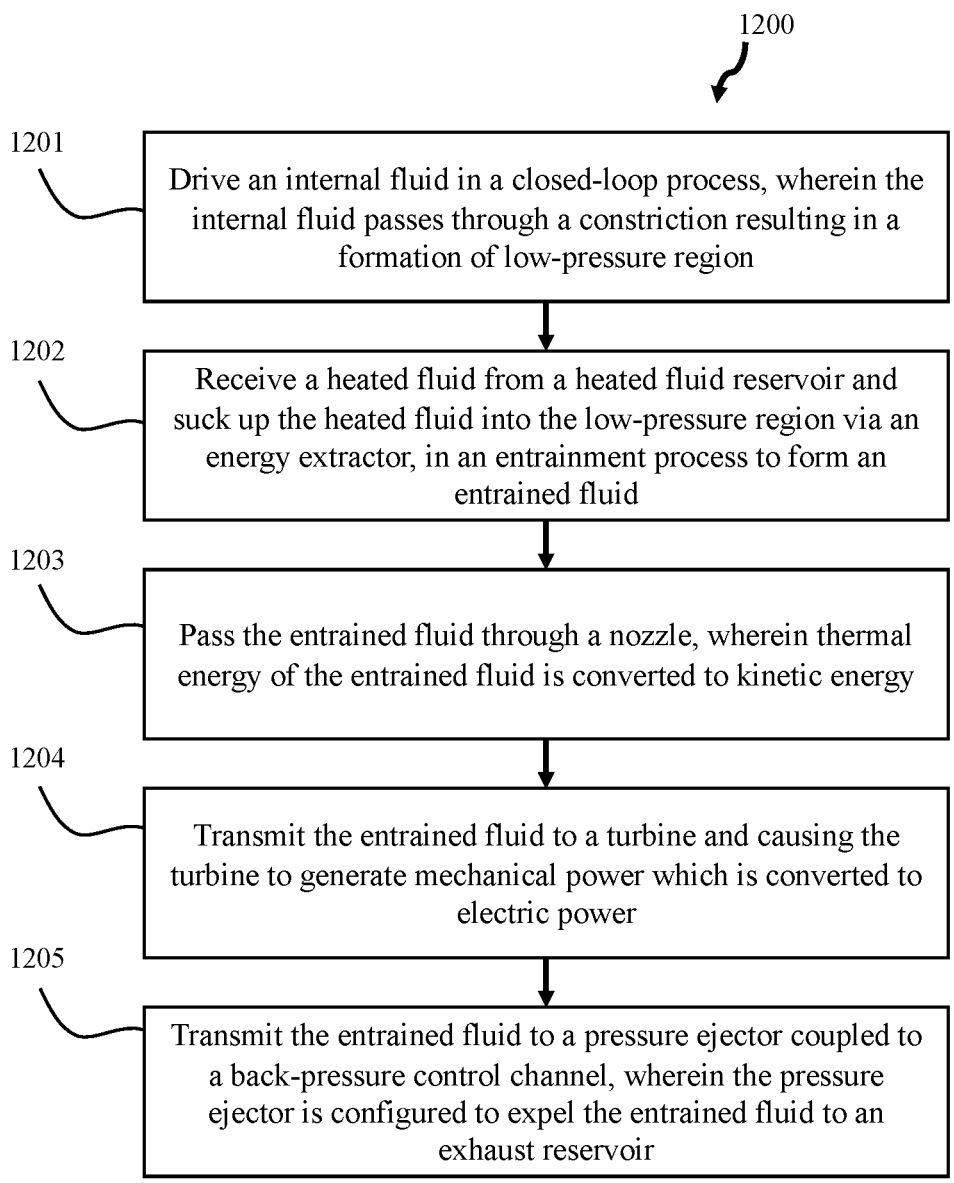
FIG. 12 is a flow diagram illustrating a method for generating power using an IFG apparatus, in accordance with an implementation of the disclosure.

FIG. 12 is a flow diagram illustrating a method for generating power using an induced flow generator apparatus. For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

As illustrated, the method 1200 begins at block 1201 when an internal fluid is driven in a closed-loop process, wherein the internal fluid passes through a constriction resulting in a formation of low-pressure region. The internal fluid may be driven via a fluid mobilization device. As described above, the internal fluid may be the internal fluid in a back-pressure control channel.

Next, at block 1202, a heated fluid is received from a source and the heated fluid is sucked up into the low-pressure region via the energy extractor in an entrainment process to form an entrained fluid.

At block 1203, the entrained fluid is passed through a nozzle, wherein the thermal energy of the entrained fluid is converted to kinetic energy.

Next, at block 1204, the entrained fluid is transmitted to a turbine and the turbine is caused to generate mechanical power which is converted to electric power.

Finally, at block 1205, the entrained fluid is transmitted to a pressure ejector coupled to a back-pressure control channel wherein the pressure ejector is configured to expel the entrained fluid to an exhaust reservoir. The exhaust reservoir may be downstream of the turbine.

The exhaust reservoir may be terrestrial atmosphere.

Although the pressure ejector may expel the entrained fluid to the exhaust reservoir, in other implementations, the pressure ejector may, in addition to or in lieu of expelling the entrained fluid to the exhaust reservoir, expel the entrained fluid to the heated fluid reservoir.

FIG. 13A illustratively depicts an induced flow generator apparatus 1300 for generating power. The apparatus 1300 includes a first heated fluid reservoir 1308 (e.g., a waste heat source), a second heated fluid reservoir 1310 (e.g., a waste heat source), a first energy extractor 1301, a first energy extraction rotor 1305, a second energy extractor 1302, a second energy extraction rotor 1306, a first pressure ejector 1303, a first exhaust reservoir 1312, a second pressure ejector 1304, a second exhaust reservoir 1314, a first back-pressure control channel 1316, a first fluid mobilization device 1320, a second fluid mobilization device 1322, a first low-pressure region 1318 and a first ET-BPCC interconnect 1324. FIG. 13B shows a second view (i.e., a side view) of apparatus 1300 described in FIG. 13A.

FIG. 13B illustratively depicts an induced flow generator apparatus 1300 for generating power portrayed in a different view. The apparatus 1300 in FIG. 13B is the same as described above with respect to FIG. 13A. The apparatus 1300 includes a first heated fluid reservoir 1308 (e.g., a waste heat reservoir), a first energy extractor 1301, a first back-pressure control channel 1316, and a second back-pressure control channel 1317. If FIG. 13A displays the front view of apparatus 1300, FIG. 13B displays the side view of apparatus 1300, displaying a second back-pressure control channel 1317, not visible in FIG. 13A as it is hidden behind back-pressure control channel 1316 in FIG. 13A. For operation, the fluid mobilization device 1320 and/or fluid mobilization device 1322 are turned on. As a result, the internal fluid in back-pressure control channel 1316 and/or back-pressure control channel 1317 starts flowing in a closed-loop manner. Note, analogues of fluid mobilization devices 1320 and 1322 are also present in back-pressure control channel 1317, though not shown here. When the internal fluid in the back-pressure control channel 1316 and/or back-pressure control channel 1317 starts flowing, it creates a low-pressure region 1318 and/or low-pressure region 1319. This in turn causes fluid to be entrained from the heated fluid reservoir 1308 and/or heated fluid reservoir 1310, and this entrained fluid passes through the energy extractor 1301 and/or energy extractor 1302. Within the energy extractor 1301 and/or energy extractor 1302, the entrained fluid is made to convert its thermal energy to kinetic energy through the use of a nozzle, and this high kinetic energy fluid is passed through the energy extraction rotor 1305 and/or energy extraction rotor 1306 to generate power. The entrained fluid passes through the ET-BPCC interconnect 1324 before entering the back-pressure control channel 1316 and/or back-pressure control channel 1317. This entrained fluid then passes back to the ET-BPCC interconnect 1324, from where it is scooped out by the pressure ejector 1303 and/or pressure ejector 1304 and the entrained fluid is expelled to the exhaust reservoir 1312 and/or exhaust reservoir 1314. The internal details of the energy extractors 1301 and 1302, pressure ejectors 1303 and 1304, the back-pressure control channels 1316 and 1317 are described previously. Although the components in FIGS. 13A and 13B include two sets of components, in other implementations, more or fewer than two sets of components may be used.

Although the orientation and relative dimensions are depicted in an exemplary implementation in figures, in other implementations, other dimensions and/or orientations may be used. For example, in FIGS. 1 and 2, the reservoir and exhaust reservoir may be located at varying heights compared to one another. In yet other implementations, the apparatus may be rotated depicting a different orientation. For example, the apparatus may be rotated ninety degrees to the right of the current depiction. In such an implementation, the height of the reservoir may be higher or lower than the exhaust reservoir. In other implementations, these heights may be substantially the same.

Some figures include areas with dashed lines representing regions. The areas may not be a physical part of the disclosed apparatus and are not material structures, but are provided merely for clarity of description.

While the implementations are susceptible to various modifications and alternative forms, specific examples thereof have been shown in the drawings and are herein described in detail. It should be understood, however, that these implementations are not to be limited to the particular form disclosed, but to the contrary, these implementations are to cover all modifications, equivalents, and alternatives falling within the spirit of the disclosure. Furthermore, any features, functions, steps, or elements of the implementations may be recited in or added to the claims, as well as negative limitations that define the inventive scope of the claims by features, functions, steps, or elements that are not within that scope.

What is claimed is:

1. An apparatus for generating power, comprising:
   a heated fluid reservoir comprising a heated fluid;
   a back-pressure control channel in the form of a closed-loop, wherein the back-pressure control channel comprises a fluid mobilization device configured to circulate an internal fluid and to form a low-pressure region within the back-pressure control channel;
   an energy extractor coupled to the heated fluid reservoir and the back-pressure control channel, wherein the energy extractor comprises an energy extraction rotor, wherein the low-pressure region in the back-pressure control channel causes the heated fluid from the heated fluid reservoir to be entrained through the energy extractor forming an entrained fluid, and wherein the energy extraction rotor is configured to extract power from the entrained fluid; and
   a pressure ejector coupled to the back-pressure control channel, wherein the pressure ejector is configured to transmit the entrained fluid to an exhaust reservoir.

2. The apparatus for generating power of claim 1, wherein the back-pressure control channel comprises a first back-pressure control channel, wherein the fluid mobilization device comprises a first fluid mobilization device, wherein the low-pressure region comprises a first low-pressure region, wherein the apparatus for generating power comprises a second back-pressure control channel coupled to the energy extractor, wherein the second back-pressure control channel comprises a second fluid mobilization device configured to circulate the internal fluid, and wherein the second fluid mobilization device is further configured to form a second low-pressure region within the second back-pressure control channel.

3. The apparatus for generating power of claim 1, wherein the energy extractor comprises a first energy extractor, wherein the energy extraction rotor comprises a first energy extraction rotor, wherein the apparatus comprises a second energy extractor coupled to the heated fluid reservoir, and wherein the second energy extractor comprises a second energy extraction rotor for extracting power from the entrained fluid.

4. The apparatus for generating power of claim 1, wherein the energy extractor comprises a nozzle, wherein the nozzle comprises a variable cross-section, and wherein the nozzle converts thermal energy of the entrained fluid to kinetic energy.

5. The apparatus for generating power of claim 4, wherein the variable cross-section is convergent.

6. The apparatus for generating power of claim 4, wherein the variable cross-section is convergent-divergent.

7. The apparatus for generating power of claim 4, wherein the variable cross-section is configured to cause the entrained fluid to flow at a velocity, and wherein the velocity is subsonic.

8. The apparatus for generating power of claim 4, wherein the variable cross-section is configured to cause the entrained fluid to flow at a velocity, and wherein the velocity is supersonic.

9. The apparatus for generating power of claim 1, wherein the pressure ejector comprises a capping wall, and wherein the capping wall is configured to at least momentarily trap and delay the entrained fluid as the pressure ejector expels the entrained fluid to the exhaust reservoir.

10. The apparatus for generating power of claim 1, wherein the pressure ejector comprises an outlet opening, wherein the outlet opening is configured to cause the entrained fluid to exit the pressure ejector and expel to the exhaust reservoir.

11. The apparatus for generating power of claim 1, wherein the fluid mobilization device comprises a fan.

12. An apparatus for generating power, comprising:
a heated fluid reservoir comprising a heated fluid;
a back-pressure control channel in the form of a closed-loop, wherein the back-pressure control channel comprises a fluid mobilization device configured to circulate an internal fluid and to form a low-pressure region within the back-pressure control channel;
a settlement chamber;
an energy extractor coupled to the heated fluid reservoir and the settlement chamber, wherein the energy extractor comprises an energy extraction rotor, wherein the low-pressure region in the back-pressure control channel causes the heated fluid from the heated fluid reservoir to be entrained through the energy extractor forming an entrained fluid, and wherein the energy extraction rotor is configured to extract power from the entrained fluid; and
a pressure ejector coupled to the back-pressure control channel, wherein the pressure ejector is configured to transmit the entrained fluid to an exhaust reservoir.

13. The apparatus for generating power of claim 12, wherein the back-pressure control channel comprises a first back-pressure control channel, wherein the fluid mobilization device comprises a first fluid mobilization device, wherein the low-pressure region comprises a first low-pressure region, wherein the apparatus comprises a second back-pressure control channel coupled to the settlement chamber, wherein the second back-pressure control channel comprises a second fluid mobilization device configured to circulate the internal fluid, and wherein the second fluid mobilization device is further configured to form a second low-pressure region within the second back-pressure control channel.

14. The apparatus for generating power of claim 12, wherein the settlement chamber comprises a first settlement chamber, wherein the apparatus comprises a second settlement chamber.

15. The apparatus for generating power of claim 12, wherein the energy extractor comprises a first energy extractor, and wherein the energy extraction rotor comprises a first energy extraction rotor, wherein the apparatus comprises a second energy extractor coupled to the heated fluid reservoir, and wherein the second energy extractor comprises a second energy extraction rotor for extracting power from the entrained fluid.

16. The apparatus for generating power of claim 12, wherein the pressure ejector comprises a first pressure ejector, wherein the apparatus comprises a second pressure ejector coupled to the back-pressure control channel.

17. The apparatus for generating power of claim 16, wherein the energy extractor comprises a first energy extractor, wherein the apparatus comprises a second energy extractor coupled to the heated fluid reservoir, and wherein the first pressure ejector is coupled to the first energy extractor and the second pressure ejector is coupled to the second energy extractor.

18. The apparatus for generating power of claim 17, wherein the first pressure ejector and the second pressure ejector are configured in a series arrangement.

19. The apparatus for generating power of claim 17, wherein the first pressure ejector and the second pressure ejector are configured in a parallel arrangement.

20. A method of generating power in an induced flow generator apparatus comprising:
driving an internal fluid in a back-pressure control channel in the form of a closed-loop, wherein the internal fluid passes through a constriction resulting in a formation of a low-pressure region;
receiving a heated fluid from a source and sucking up the heated fluid into the low-pressure region via an energy extractor in an entrainment process to form an entrained fluid;
passing the entrained fluid through a nozzle, wherein thermal energy of the entrained fluid is converted to kinetic energy;
transmitting the entrained fluid to a turbine and causing the turbine to generate mechanical power which is converted to electric power; and
transmitting the entrained fluid to a pressure ejector coupled to the back-pressure control channel, wherein the pressure ejector is configured to expel the entrained fluid to an exhaust reservoir.

* * * * *